Inventor
BERTIE C. GOLDEN
By Munson H. Lane
Attorney

April 25, 1950

B. C. GOLDEN 2,504,974

BAG STRINGING MACHINE

Filed Dec. 21, 1943

Inventor
BERTIE C. GOLDEN

By Munson H. Lane

Attorney

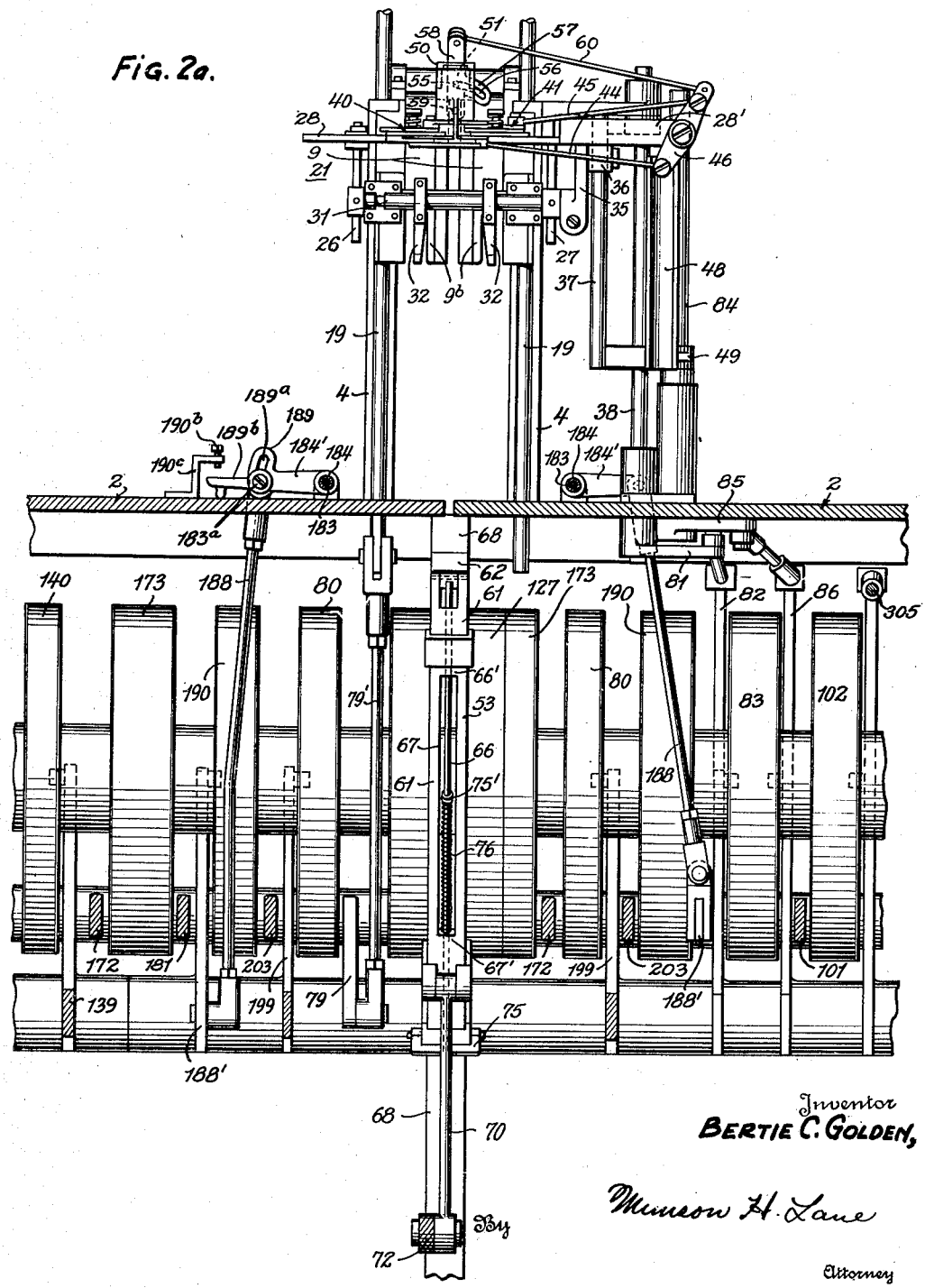

April 25, 1950  B. C. GOLDEN  2,504,974
BAG STRINGING MACHINE
Filed Dec. 21, 1943  29 Sheets-Sheet 16
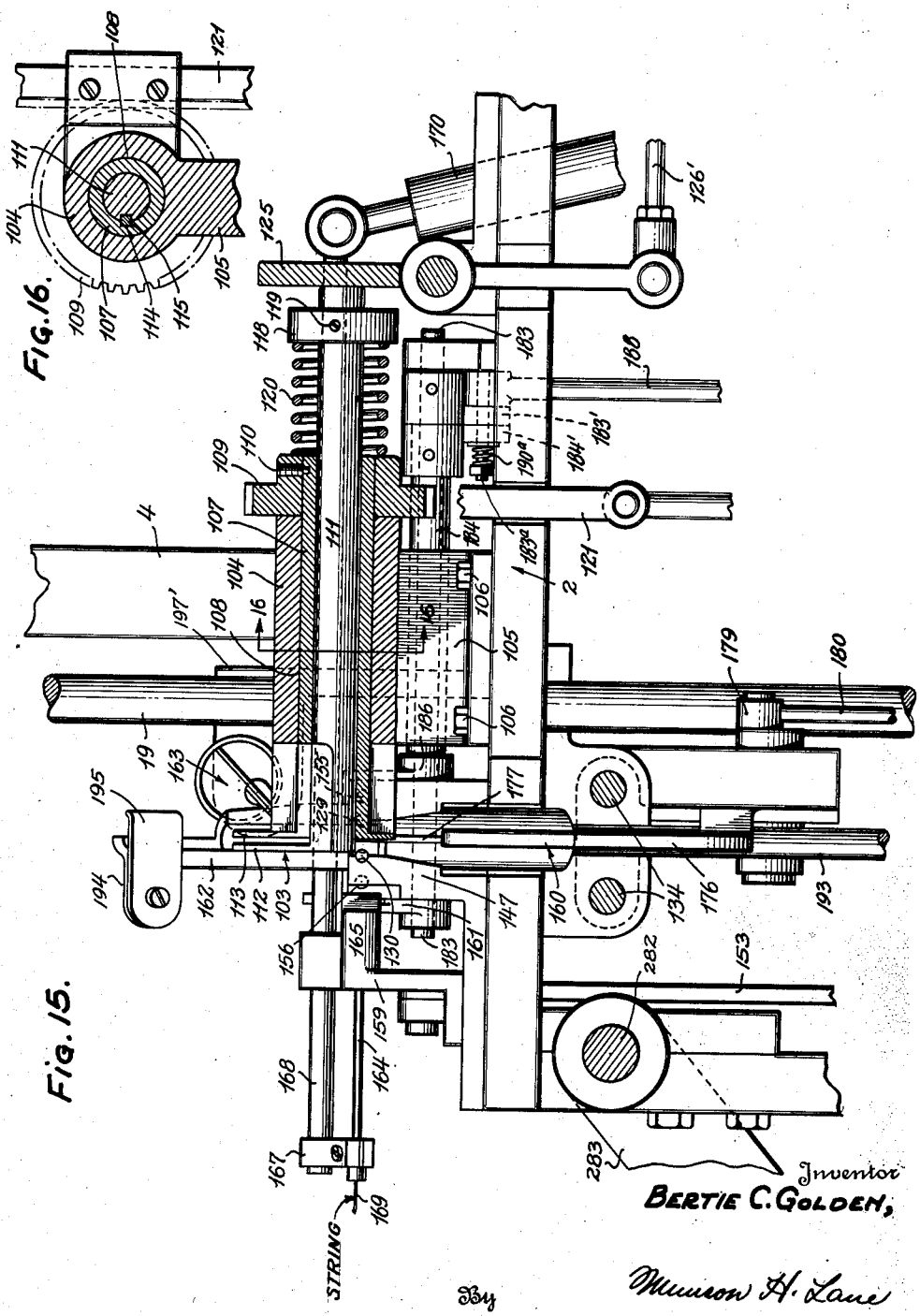

April 25, 1950  B. C. GOLDEN  2,504,974
BAG STRINGING MACHINE
Filed Dec. 21, 1943  29 Sheets-Sheet 17
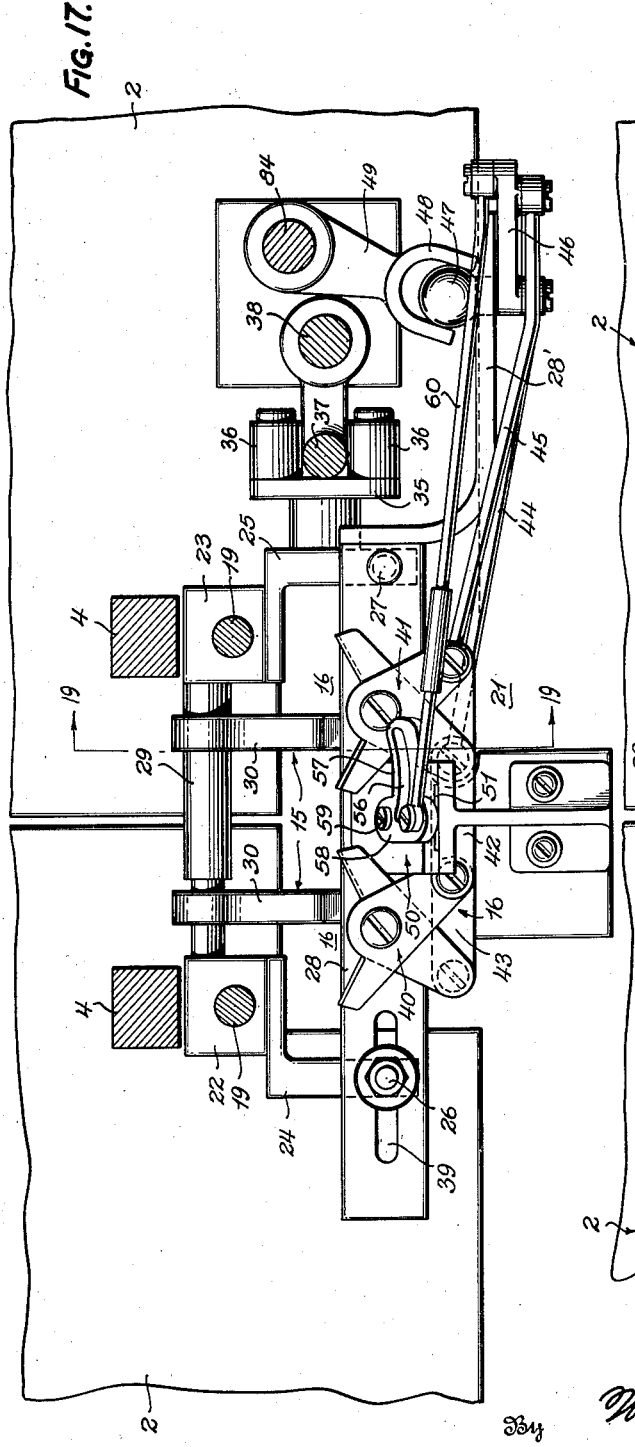
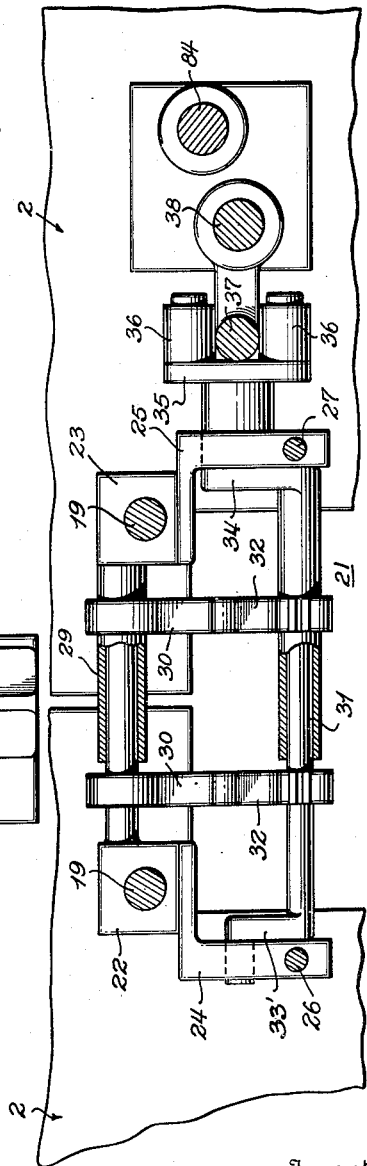
Inventor
BERTIE C. GOLDEN
By Munson H. Lane
Attorney April 25, 1950  B. C. GOLDEN  2,504,974
BAG STRINGING MACHINE
Filed Dec. 21, 1943  29 Sheets-Sheet 18
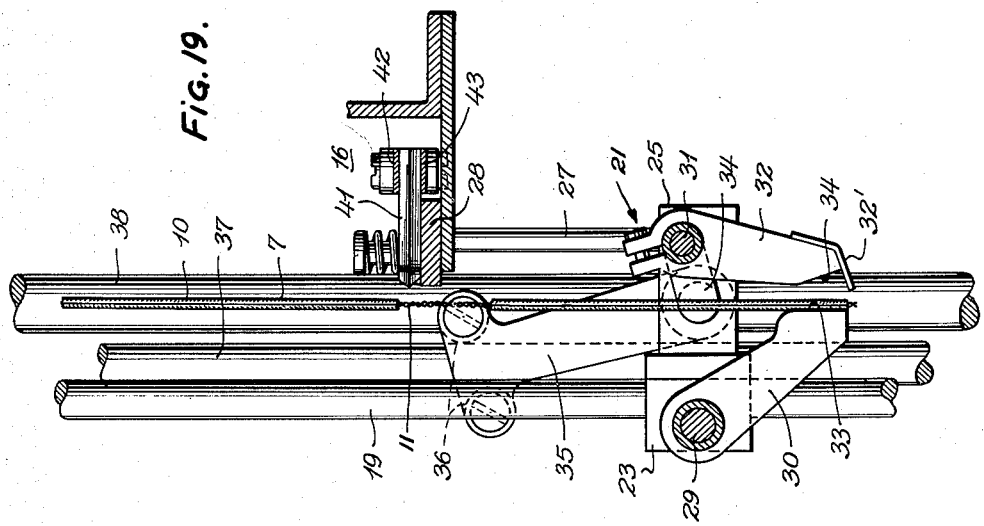
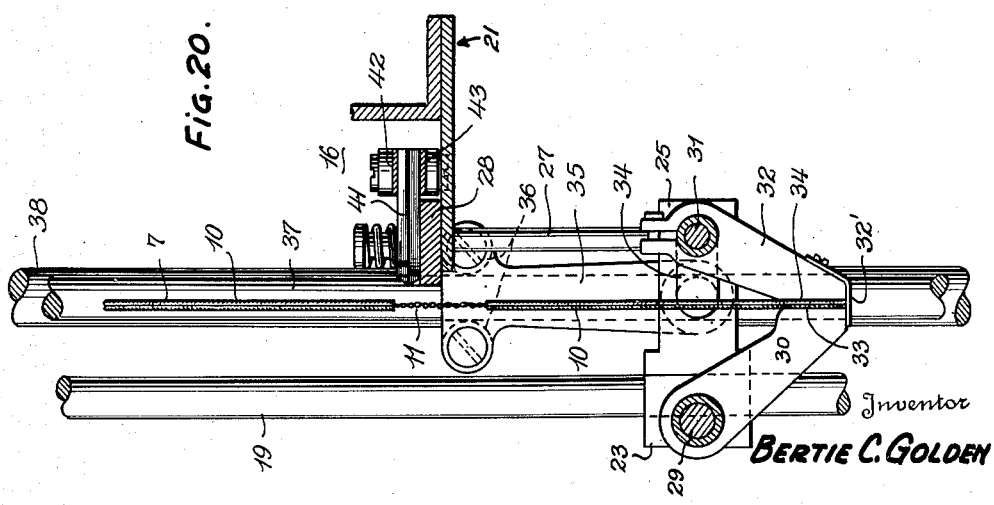
Inventor
BERTIE C. GOLDEN
By Munson H. Lane
Attorney

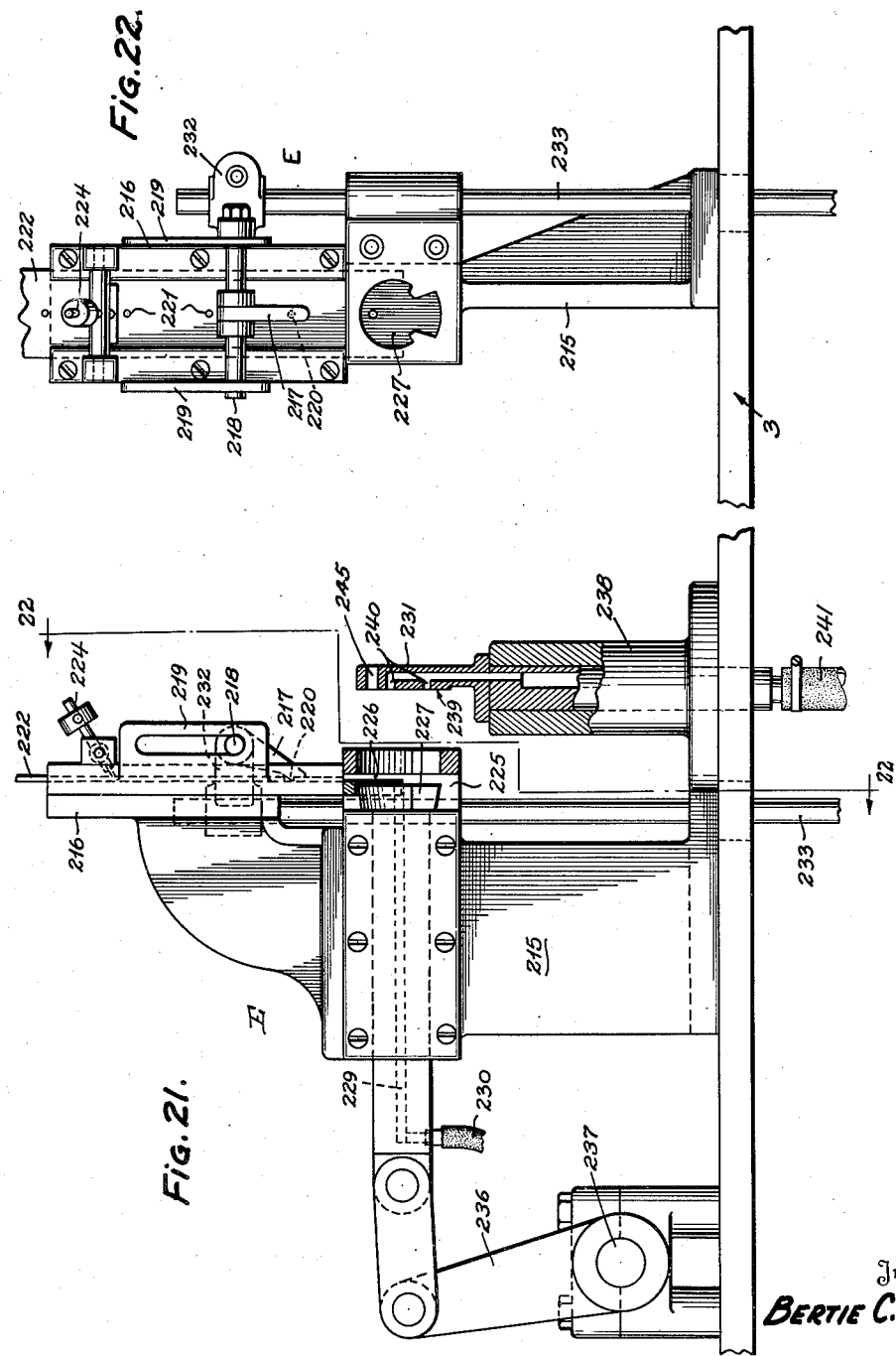

April 25, 1950  B. C. GOLDEN  2,504,974
BAG STRINGING MACHINE
Filed Dec. 21, 1943  29 Sheets-Sheet 20
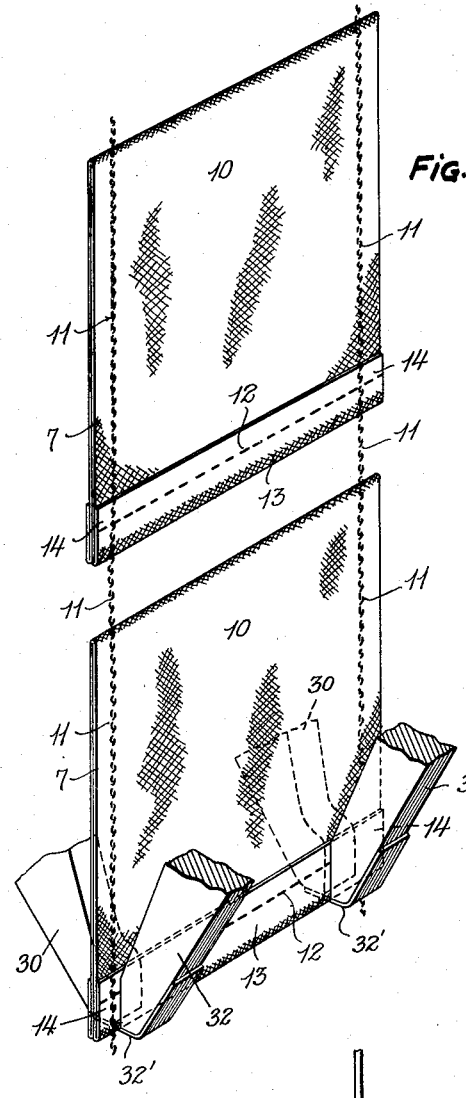
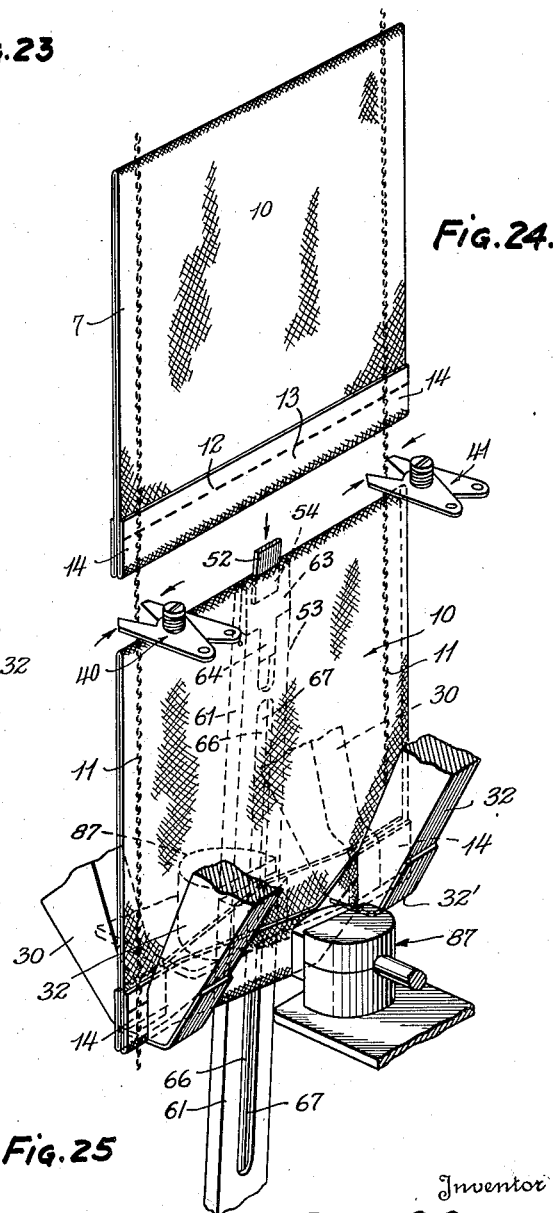
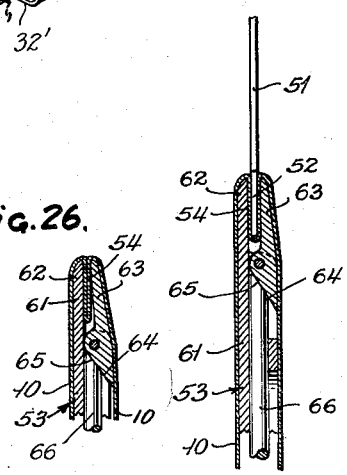
Inventor
BERTIE C. GOLDEN
By Munson H. Lane
Attorney April 25, 1950     B. C. GOLDEN     2,504,974
BAG STRINGING MACHINE Filed Dec. 21, 1943                          29 Sheets-Sheet 21

Inventor
BERTIE C. GOLDEN
By Munson H. Lane
Attorney

April 25, 1950   B. C. GOLDEN   2,504,974
BAG STRINGING MACHINE
Filed Dec. 21, 1943   29 Sheets-Sheet 22
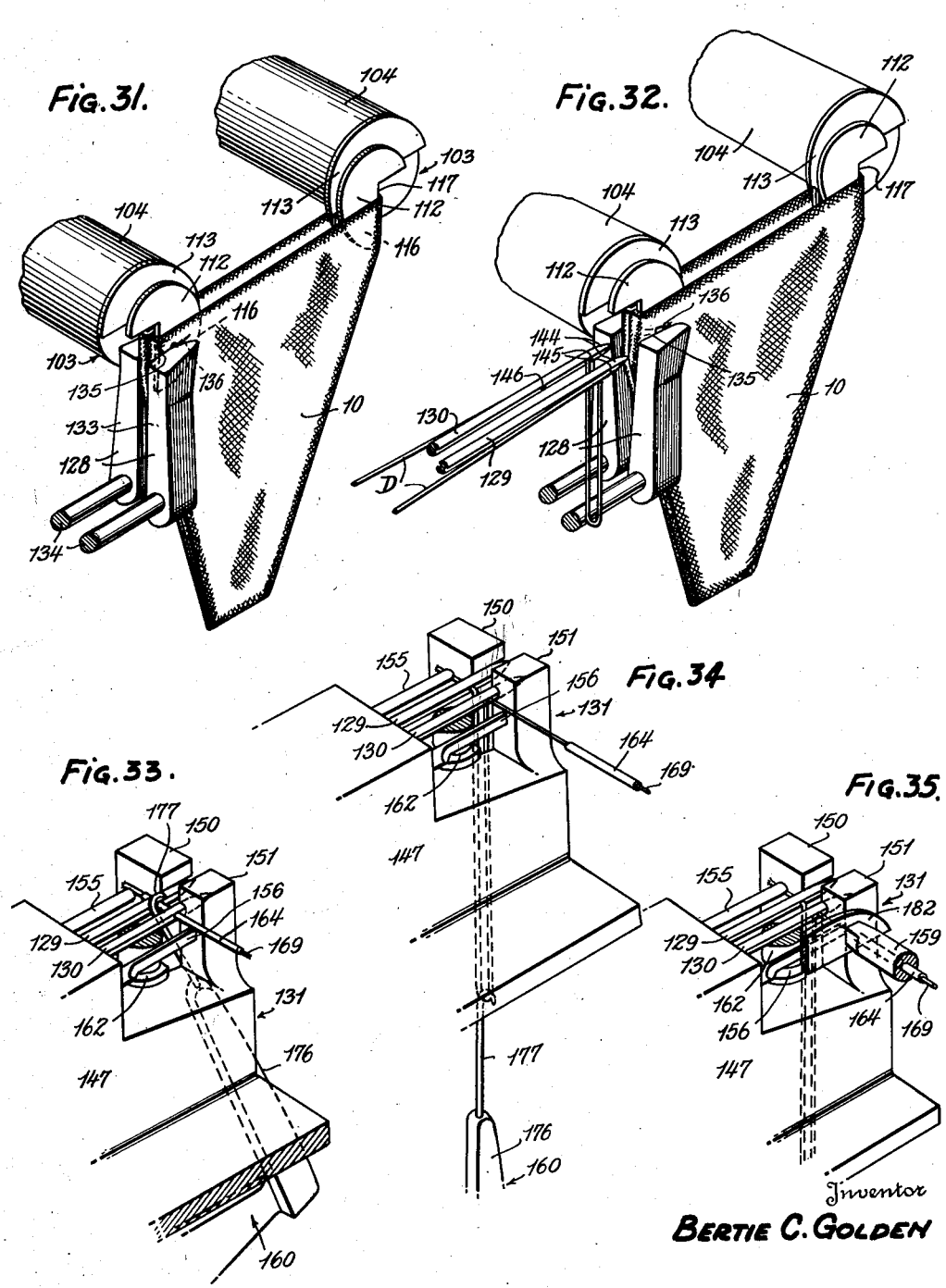
Inventor
BERTIE C. GOLDEN
By Munson H. Lane
Attorney April 25, 1950    B. C. GOLDEN    2,504,974
BAG STRINGING MACHINE
Filed Dec. 21, 1943    29 Sheets-Sheet 23
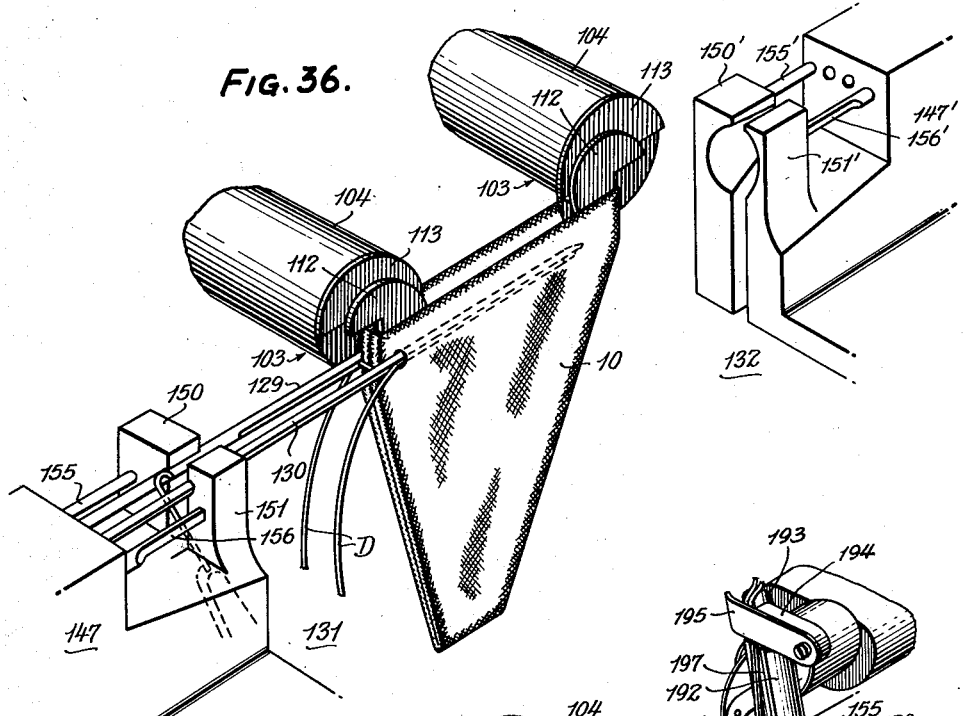
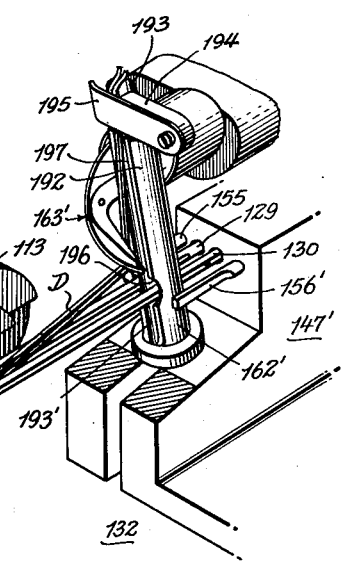
Inventor
BERTIE C. GOLDEN
By Munson H. Lane
Attorney

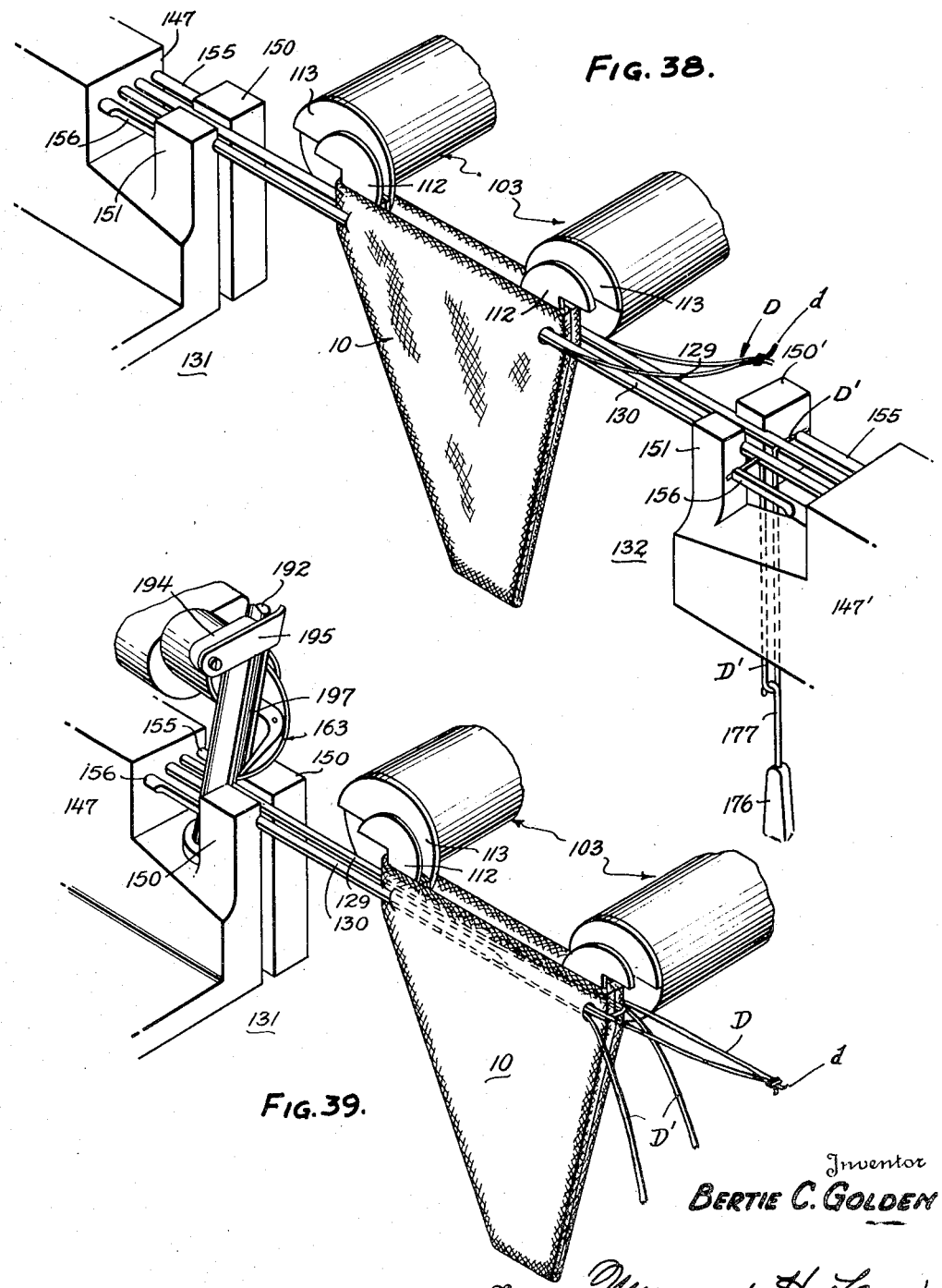

April 25, 1950     B. C. GOLDEN     2,504,974
BAG STRINGING MACHINE

Filed Dec. 21, 1943     29 Sheets-Sheet 25

Inventor
BERTIE C. GOLDEN
By Munson H. Lane
Attorney

April 25, 1950  B. C. GOLDEN  2,504,974
BAG STRINGING MACHINE
Filed Dec. 21, 1943  29 Sheets-Sheet 26

Inventor
BERTIE C. GOLDEN
By Munson H. Lane
Attorney

April 25, 1950 B. C. GOLDEN 2,504,974
BAG STRINGING MACHINE
Filed Dec. 21, 1943 29 Sheets-Sheet 27
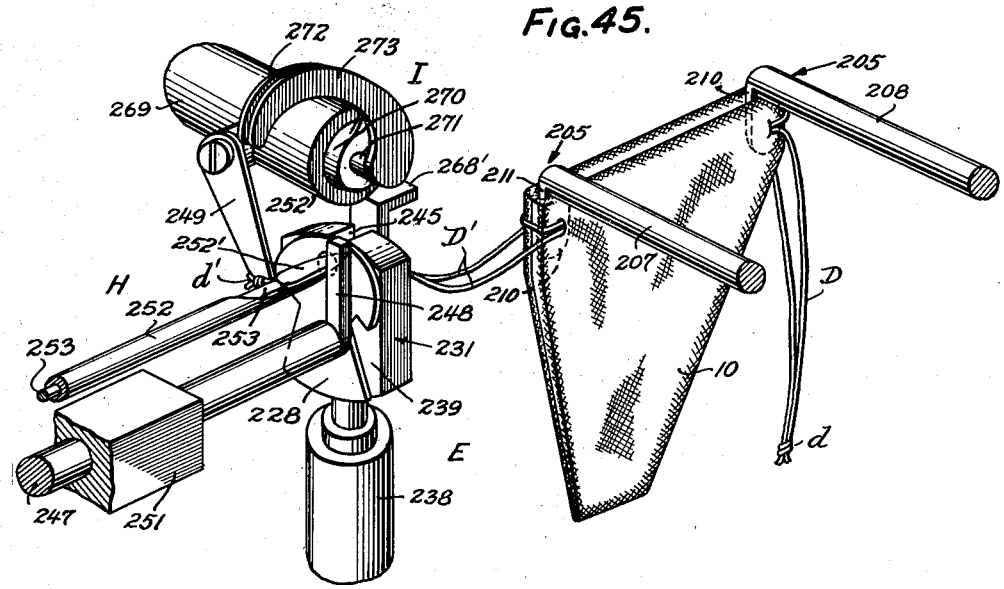
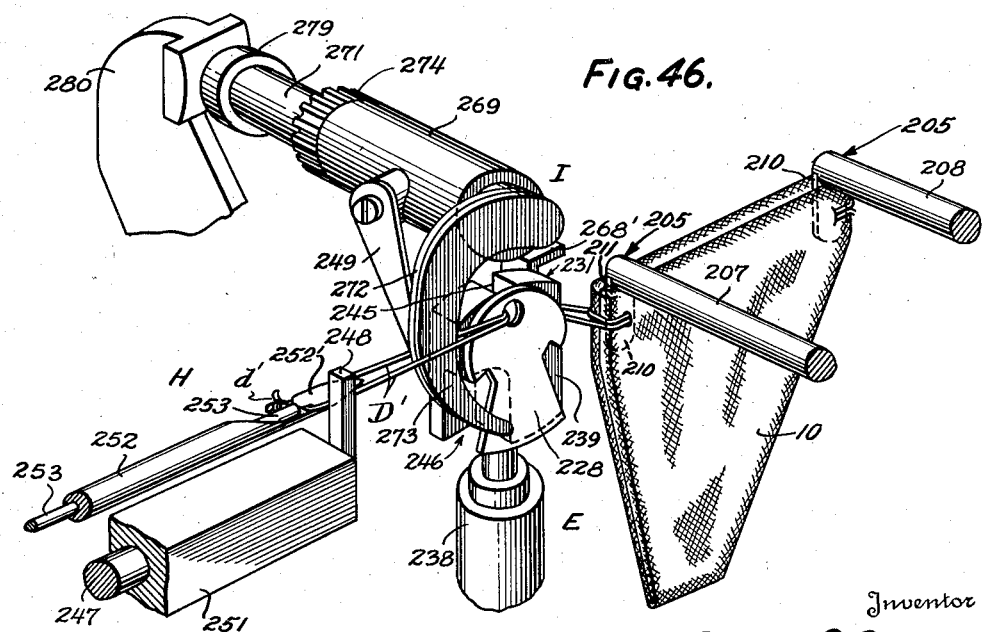
Inventor
BERTIE C. GOLDEN
By Munson H. Lane
Attorney April 25, 1950 B. C. GOLDEN 2,504,974
BAG STRINGING MACHINE
Filed Dec. 21, 1943 29 Sheets-Sheet 28

Inventor
BERTIE C. GOLDEN
By Munson H. Lane
Attorney

Patented Apr. 25, 1950

2,504,974

UNITED STATES PATENT OFFICE 2,504,974

BAG STRINGING MACHINE

Bertie C. Golden, Richmond, Va., assignor to Millhiser Bag Company, Inc., Richmond, Va., a corporation of Virginia Application December 21, 1943, Serial No. 515,164

48 Claims. (Cl. 112—2)

My invention relates to the manufacture of bags having draw strings for closing the mouth thereof, and includes among its objects and advantages the provision of an improved bag stringing machine.

The present invention is an improvement upon the bag stringing machine disclosed in my prior Patent No. 2,296,783, dated September 22, 1942, and, while primarily concerned with the insertion of draw strings in tobacco bags, is equally well adapted to the application of draw strings to bags of other types.

Among the distinctive features of the present device are: (1) a more compact and efficient arrangement of parts whereby the machine occupies comparatively little space; (2) improvements in the bag feeding mechanism; (3) improvements in the draw string threading needles and in the needle threading mechanism; (4) improvements in the hem piercing mechanism; (5) an improved combination of the bag stringing supporting mechanism with tagging mechanism, and (6) improvements in the tagging device per se. The last two named improvements form the subject matter of my divisional application Serial No. 662,753, filed April 17, 1946. Other novel and distinctive features of the invention will appear as the invention is more fully described hereinafter.

The manufacture of tobacco bags according to modern production methods involves two separate and distinct stages. The first stage consists in sewing hems at two opposite ends of a rectangular sheet of fabric, folding the sheet back upon itself intermediate its hemmed ends, with the line of fold constituting the central bottom area of the bag, and subsequently sewing the folded sheet along two opposite side margins thereof.

The bag is uniform in width from the hemmed end, which constitutes the open end of the bag, down to its bottom. The bags are sewed in the formation of a chain, wherein the bags are connected together at spaced intervals by the continuous side seam threads which close the sides of the bag, as above set forth, and the bags are so arranged that the open end of one bag follows the closed bottom end of the preceding bag.

The second stage consists in the insertion of draw strings in the hems of the individual bags, and the bags in the chain are wrong side out so that the stringing stage requires reversal of the bags to bring the right sides out, in addition to insertion of the draw strings. My machine is designed to handle the bags as they come from the sewing stage in chain formation, and embodies novel means for reversing the successive bags and threading the draw strings through the hems and subsequently tagging the bags and delivering the bags to a collection hopper in an orderly manner, with both draw strings of each bag having their projecting ends lying wholly outside that bag and a tag fastened to one of the draw strings.

More specifically, my machine includes a bag feeder mechanism for advancing successive bags to the reversing mechanism and the string threading needles. The grippers of the feeder mechanism advance the bag chain a predetermined distance, after which a seam thread cutter is brought into play for cutting the foremost bag from the chain. The seam thread cutter and the grippers of the feeder mechanism are in the nature of a carriage which advances a predetermined distance before the seam thread cutter is actuated, and the seam thread cutter is spaced a predetermined distance from the grippers of the feeder mechanism. Thus the seam threads are severed at the same distances from the bottom of each bag, regardless of the fact that the connecting seam threads in the chain might be variable as to length.

The feeder mechanism also includes means for positioning the leading or open end of each successive bag in a predetermined position prior to the gripping action of the grippers of the feeder mechanism to provide accommodation for variable spacing between the bags in the chain. In other words, the bags are accurate with respect to length but the bags are not always spaced equal distances one from the other in the chain. Accordingly, each bag is brought into a predetermined and exact position with respect to the feeder mechanism grippers and is gripped in that position, with the seam thread cutter maintaining a definite spacing with respect to the grippers, and the seam thread cutter is brought into play after each bag has been advanced a predetermined distance so that all slack is removed from the bag, with the result that the strands are precisely severed in each instance.

As each bag is advanced into the zone of the bag reversing mechanism, a pin action comprising resilient bag mouth grippers coacts with the hem areas of the bag for opening its mouth preparatory to the entry of a plunger gripper acting to reverse the bag. These bag mouth grippers are of resilient type so as to yield in such manner as to prevent undue punching or tearing of the bag when the bag is reversed. A conditioning or tucking plunger is brought into play for looping or tucking the bottom area of the bag inwardly to provide a tongue which is grasped by the plunger gripper. The bag reversing mechanism includes corner grippers which grasp and hold the top or open end of the bag firmly as the plunger gripper exerts a pull on the bottom of the bag and pulls the bottom through the bag for reversing the same. The corner grippers of the reversing mechanism are so fashioned as to rotate in a peculiar manner to the end that the open end of the bag and the corner portions at this end of the bag will be completely reversed in a neat and regular manner and the mouth of the bag held spread open preparatory to insertion of the draw strings.

The conventional square-bottomed tobacco bag is uniform in width from the hem down to the bottom. When such a bag, reversed so as to be uniform in width from the hem to the bottom, is filled, there is a decrease in its width throughout the greater part of its length, but the bottom of the bag does not correspondingly shorten transversely of the bag. In other words, the length of the bottom of the bag will remain substantially the same after the bag is filled as it was before and the corners of the bag will project beyond the width of the bag and present an unsightly appearance. It is therefore desirable to reverse the bag in such manner that the corners are tucked in before the bag is filled. During filling the corners will be forced outwardly and will form nicely, and will be supported by the material within the bag, so that the filled bag will have and will maintain a uniform width from top to bottom. In my invention, the reversing mechanism is so designed as to reverse the bags in an efficient manner so that the mouth end of the bag may be opened to its maximum width, while at the same time leaving the bottom part and bottom corners of the bag tucked in in such a degree that the bag can be filled in an expeditious manner, with the bag taking a perfectly square bottom with respect to contour, as well as uniform width from top to bottom.

Upon reversal of the bag, the draw string threading mechanism is brought into play for inserting two draw strings which project in opposite directions from the two sides of the bag, and the draw strings are cut for length and knotted to provide closed loops which effectively draw the mouth of the bag to a closed position when the draw strings are pulled simultaneously in opposite directions. The draw string threading mechanism includes two nickers or piercers for first punching needle entrance openings in the two hems immediately adjacent the seam at one side of the bag, and two needles arranged to enter the openings and traverse the hems for inserting one draw string in one direction across the bag, after which the needles, upon their return trip, draw the second draw string through the hems. The nickers or piercers are adapted to pierce the hems on substantially straight lines parallel with the paths of travel of the needles to facilitate penetration of the hems by the needles for string threading purposes, and to reduce the size of the holes formed to the smallest degree required. By this means the projecting ends of the completed draw strings will be properly held in position and the formation of large holes prevented such as would allow the ends of the string to loop over the corners of the bag and hold the same open and permit the contents of the bag to leak out.

One draw string is first pulled and measured for length, threaded through the hems and knotted to provide a pull string of loop formation, after which the second draw string is drawn and measured for length, threaded through the same hems and subsequently knotted in the form of a closed loop, with the two draw strings projecting laterally of the two sides of the bag, and with the projecting runs of the draw strings lying wholly outside the bag. Complete and accurate reversal of the bags at their mouths before the draw strings are inserted permits the draw strings to be so incorporated in the hems that their projecting ends will lie wholly outside the bag. In filling bags, it is important that the bags be of uniform contour and that the ends of the draw strings lie wholly outside the bag. The present invention operates to reverse the bags accurately with respect to contour, and the draw strings are inserted immediately adjacent the two side seams, with the ends of the strings maintained in the clear of the open ends of the bags.

As the two strings are inserted, cut and tied, bag stacking grippers are actuated for moving the successive bags to a tagging mechanism, where a tag is loop-fastened to one of the projecting draw strings, and thence the bags are moved to a collection hopper, where the bags may be collected in bundles of predetermined numbers, boxed or otherwise bundled to facilitate handling and transportation to the user or filling facilities. All the bags are stacked side to side and substantially on end in the collection hopper, with the string ends of the bags uppermost.

The tagging mechanism is or may be similar in general respects to that disclosed in my prior Patent No. 2,304,908, dated December 15, 1942, but embodies novel means for holding and stringing the tag and to adapt such mechanism to be efficiently used in connection with the stringing and delivery means of a bag stringing machine. Preferably, instead of using ready made tags, there is provided a tag stamping mechanism which operates in conjunction with the tag stringing mechanism and a tag applying mechanism. This stamping mechanism may consist of a stamping die and a feeding means for feeding an endless strip of pre-printed embryo tags to the die, which stamps them out for use, or the stamping mechanism may be of any other preferred and suitable type and construction.

The present invention, in addition to the provision of the novel features above described, is designed to generally simplify and improve the construction and increase the practical efficiency of machines of this character, as well as to provide a machine which is of compact character and occupies comparatively little floor space.

In the accompanying drawings:

Fig. 2a is a view similiar to Fig. 2, showing the bag feed carriage elevated and illustrating certain parts omitted in Fig. 2 and omitting certain parts shown in Fig. 2;

Figures 49, 50:
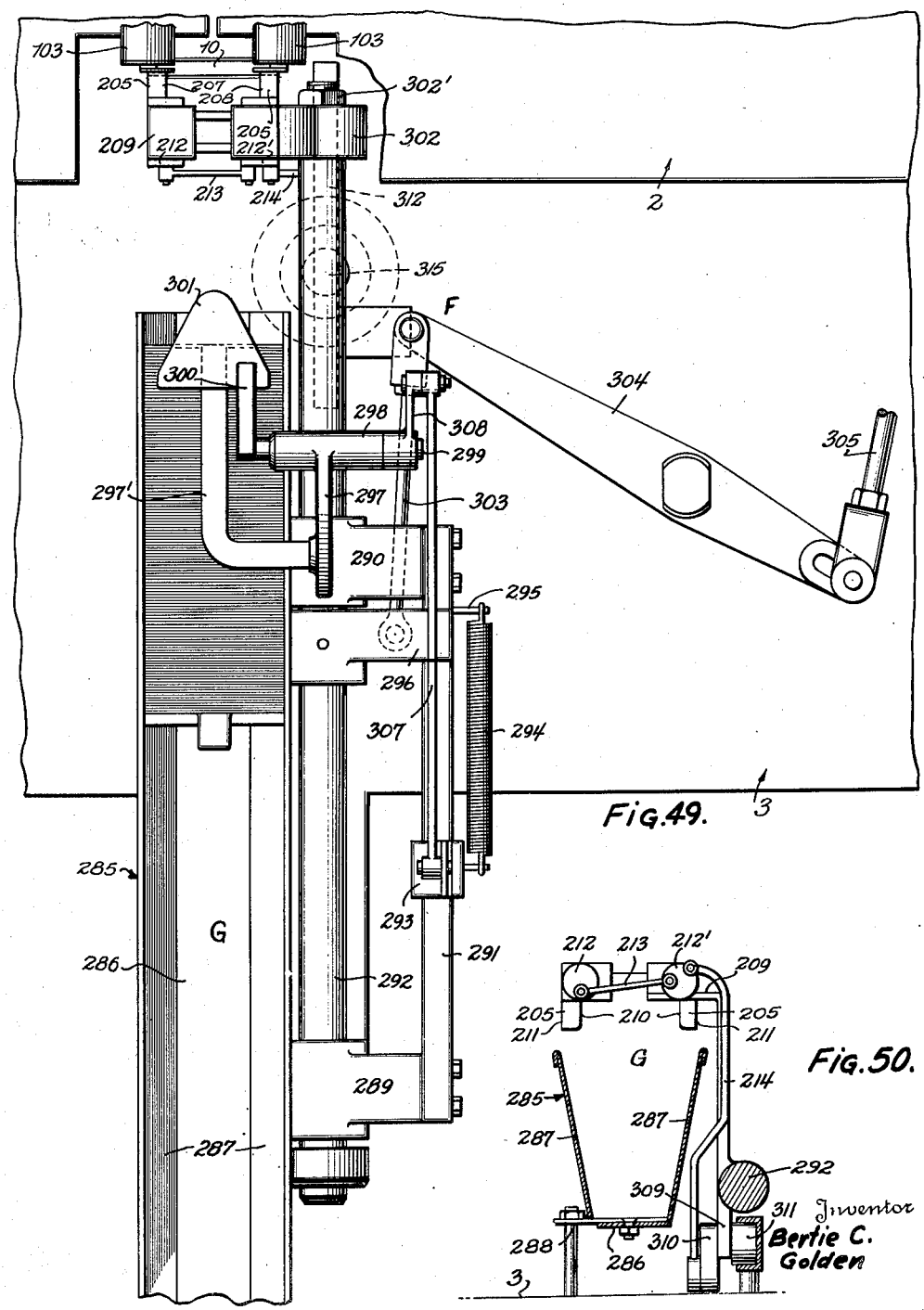

trating the bag stacker grippers in position to receive a bag from the reversing grippers; and Fig. 50 is a vertical section through the bag stacking mechanism.

Frame and bag feeding mechanism

In the practical embodiment of my invention as herein disclosed, I provide a frame 1 of suitable construction (Figs. 1-5) and including a front upper platform or table portion 2, and a lower rear platform or table portion 3. Fixed to and rising from the table portion 2 are uprights 4 which support an elevated horizontal guide platform 5 for the support and feed to a vertical guideway structure 6 of a chain 7 of bags which are to be supplied with drawstrings. The platform 5 extends from the forward portion of the machine over the table 2 to the upper end of the vertical guideway structure 6. Said platform 5 comprises a bed plate 5' (Fig. 2) over which the bags may slide, and suitable means for holding the bags from lateral displacement and in contact with the bed-plate. At the front end of the platform 5 is a downwardly curved plate 8 (Fig. 1) over which the bag chain 7 passes as it moves upwardly and forwardly for travel over the platform 5, and at the rear end of the platform 5 are gravity acting arms 9 (Figs. 1 and 5), pivotally mounted at their rear ends, as at 9a, which press the bag chain against the guide platform and have downwardly curved pressure fingers 9b which guide the bag chain downwardly against the guide surface of the guideway structure 6 and press the bags of the chain in contact therewith. Suitable mechanism for positively feeding the bags along the guideway 5 may be employed if desired, or reliance for the feeding action may be placed upon the feed grippers of a bag feeding and severing mechanism arranged for travel along the guideway structure 6, as hereinafter described. The bag chain may be pulled from a large bundle of bags which are so folded as to permit the chain to be paid out without tangling thereof. Handling of bag chains of this type is well known in the art and need not be described in further detail. The bags 10 are connected in the form of a chain through the medium of the side seam threads 11 (Figs. 1, 23 and 24), and each side of the bag is provided with a cross stitch 12 forming a hem 13 extending the full width of the bag and defining its mouth end. Preferably the side seam threads are located inwardly of the side edges of the bag to provide the bag body and its hem portions with flaps 14 projecting laterally beyond said threads and adapting the bag to be better gripped by gripping elements of the stringing mechanism, as hereinafter described. The bags of the chain are spaced as nearly as practicable the same distance apart by the interconnecting portions of the side seam threads. The spacing is such that on predetermined movements of the bag chain the bags are adapted to be successively brought into position at a first or starting stage point A (Fig. 1) at the upper end of the guideway 6 for action thereon of the bag mouth feed gripper means 15 and bag severing means 16 of the bag stringing mechanism.

The vertical guideway structure 6 includes a guide plate or guide plates 17 (Fig. 2) preferably integral with and bent down from the bed plate 5'. The plates 17 are arranged just in rear of the downwardly curved fingers 9b of the friction arms 9 in the line of feed of the bag chain as it passes from the guide platform 5 down into the guideway 6, and the arms 9 and their fingers 9b act to press the adjacent bag of the chain against the bed and guide plates with just sufficient force to retain the foremost bag of the chain in position at station A to be engaged by the grippers 15 on an upward movement of the latter from their lowered position shown in Figs. 1 and 2. The outer side edges of the plates 17 of the guideway structure 6 are formed with ribs or flanges 18 which act as guides engaged by the side edges of the bag chain to guide it in a true downward path.

Rods or bars 19 are slidably mounted in openings in the table 2 and in guide blocks 20 fastened to the guideway 5 or uprights 4, and these rods or bars support a carriage 21 (Figs. 1, 2a, 5 and 17 to 20) movable up and down with relation to the guideway 6. This carriage, which supports the hem gripper means 15 and the bag severing means 16, includes bracket members in the form of blocks 22 and 23 (Figs. 17 to 20) secured to the rods 19, bracket arms 24 and 25 carried by the respective blocks and projecting beyond the rear side of the guideway, bolts 26 and 27 projecting upwardly from the arms 24 and 25, a platform or cutter carrier plate 28 extending between said arms and fastened thereto by said bolts, and an extension arm 28' (Figs. 2a and 17) projecting from one end of the plate portion of the bracket. The blocks 22 and 23 support the telescopically connected sections of a fixed gripper rod or shaft 29 to which are fixedly secured two gripper arms 30, while the bracket arms 24 and 25 form bearings in which are journaled the outer ends of the telescopically connected sections of a rock shaft 31 to which are fixed two oscillating gripper arms 32 arranged opposite to and adapted for coaction with the gripper arms 30. The gripper arms 30 are mounted to travel upwardly and downwardly with the carriage but are fixed with relation to the oscillating gripper arms 32, which latter, while also mounted to travel upwardly and downwardly with the carriage, are adapted to be oscillated toward and from the gripper arms 30 through rocking motions of their shaft 31. Each gripper arm 30 extends at a downward and rearward angle from its shaft (see Figs. 19 and 20) and has its free end terminating in a vertical gripping face 33 arranged just in rear of the path of travel of the bags 10 along the guideway 6. The faces 33 of the fixed gripper arms 30 form fixed abutments for coaction with angularly disposed clamping faces 34 at the free ends of the oscillating gripper arms 32, which normally depend from their shaft and lie outwardly and rearwardly of the path of travel of the bags 10 down the guideway 6, as shown in Fig. 19. The oscillating gripper arms 32 are adapted to be oscillated by reverse movements of their shaft into and out of engagement with the mouth of a bag and to be brought to the position shown in Fig. 20 for cooperation with the gripper arms 30 to clamp the bag for downward travel with the carriage. The gripper arms 32 are provided with resilient extension fingers 32' which are adapted to engage the mouth end of the bag in advance of the gripping action and adjust such end of the bag for accurate engagement by the gripping surfaces 33 and 34.

Figure 1:
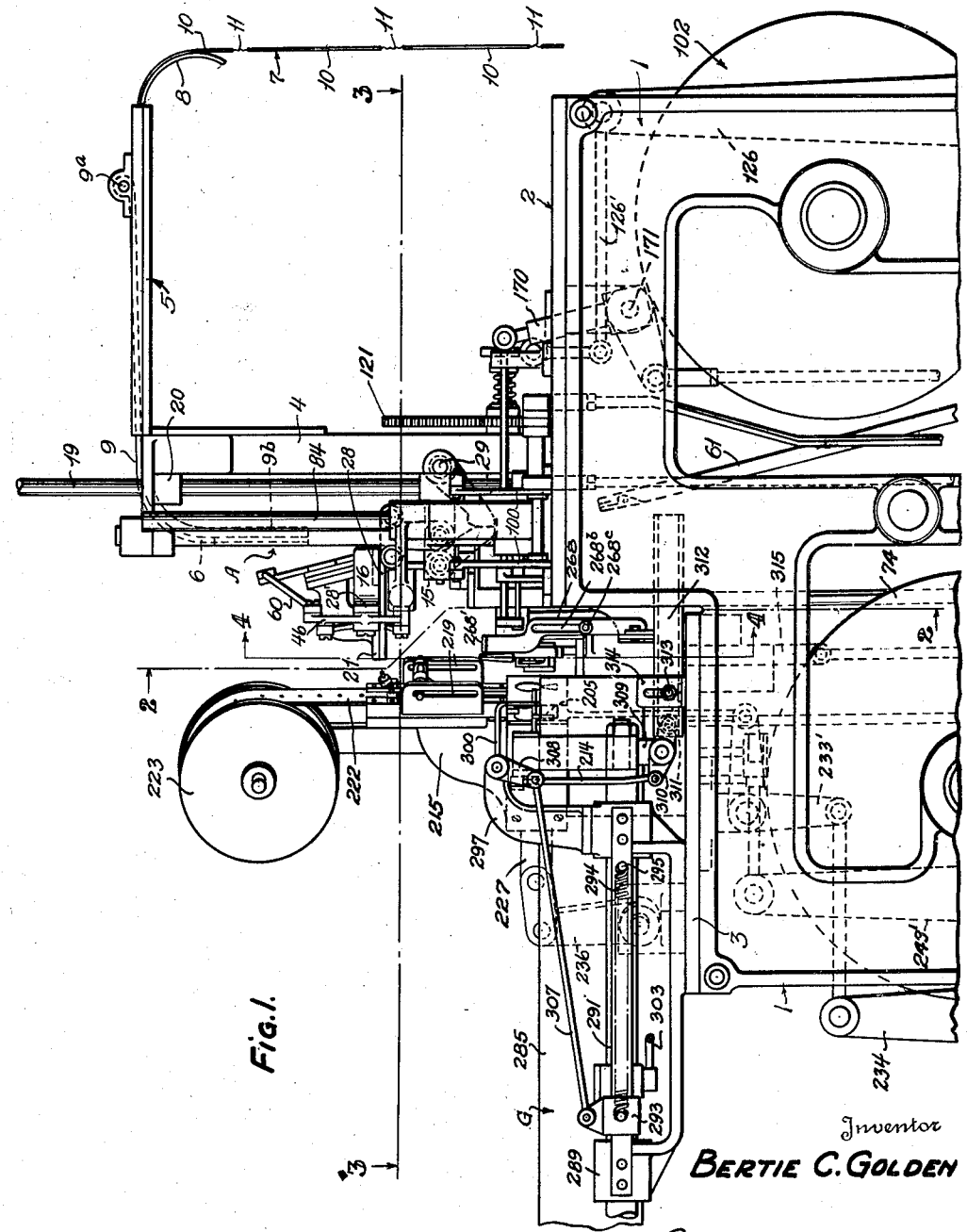
Fig. 1 is a side elevational view, with parts broken away, of a machine of the character described constructed in accordance with my invention.
Figure 2:
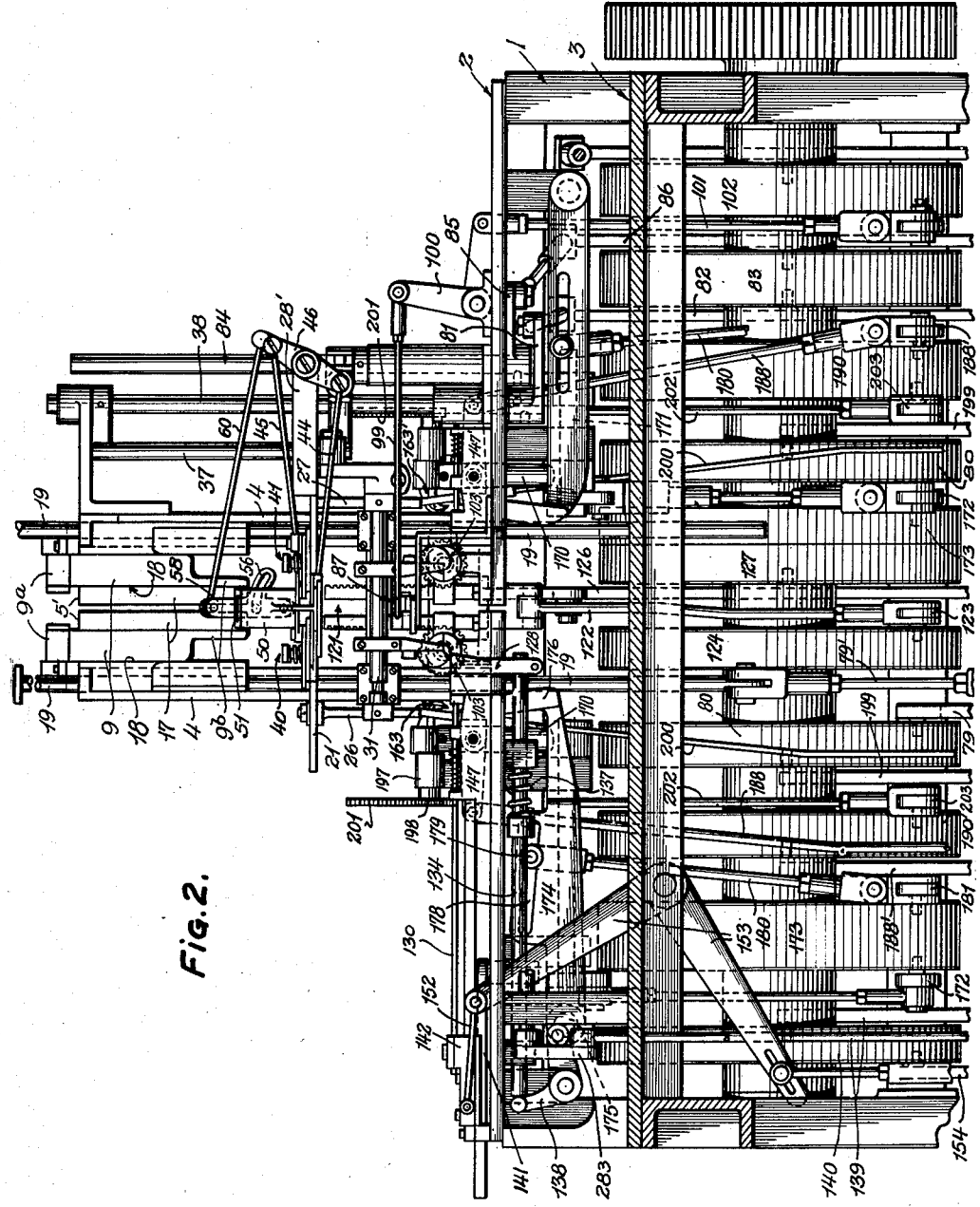
Fig. 2 is a vertical sectional view taken substantially on the line 2—2 of Fig. 1, with parts omitted to more clearly show other related coacting parts of the machine.
Figure 5:
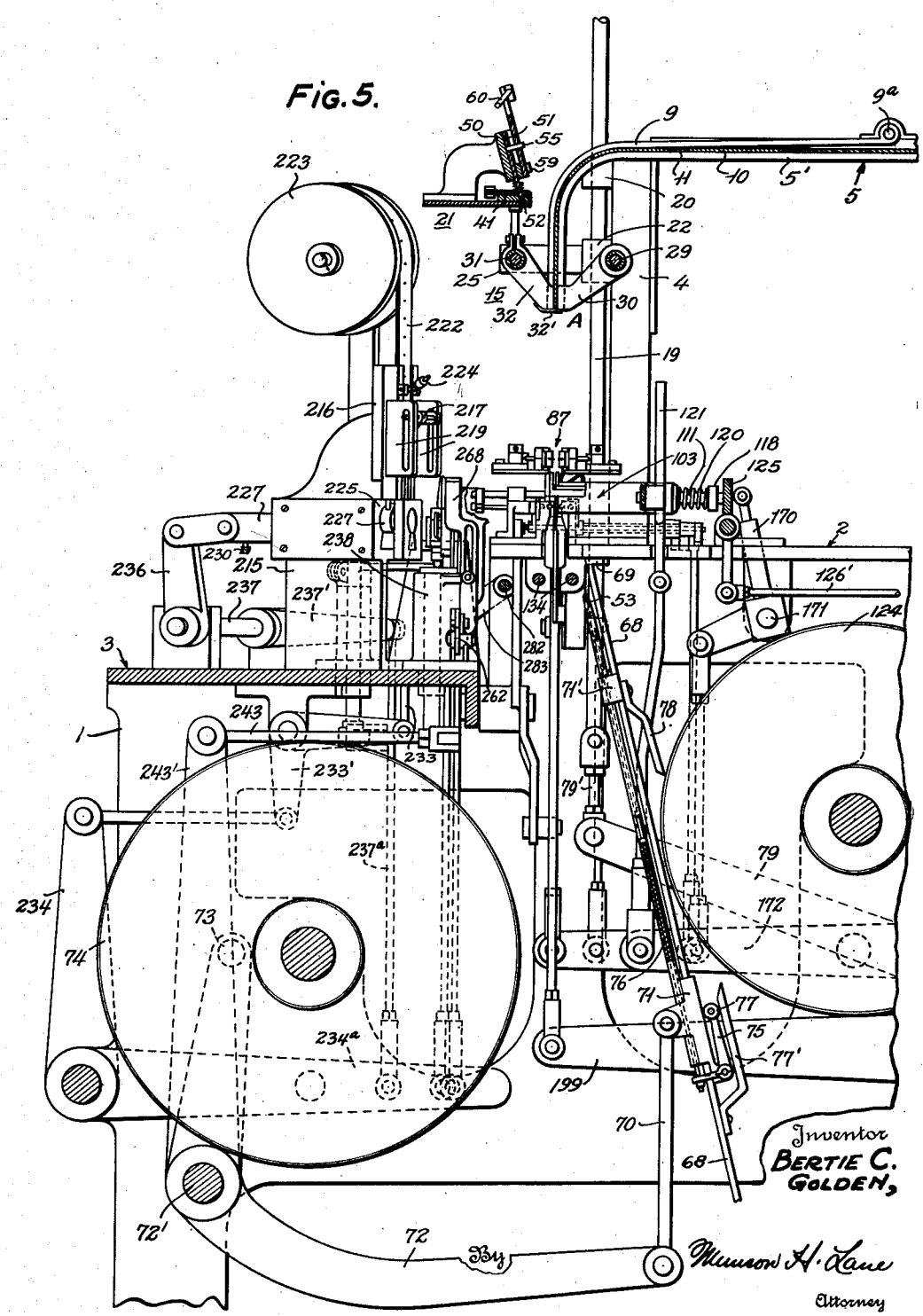
Figure 6:
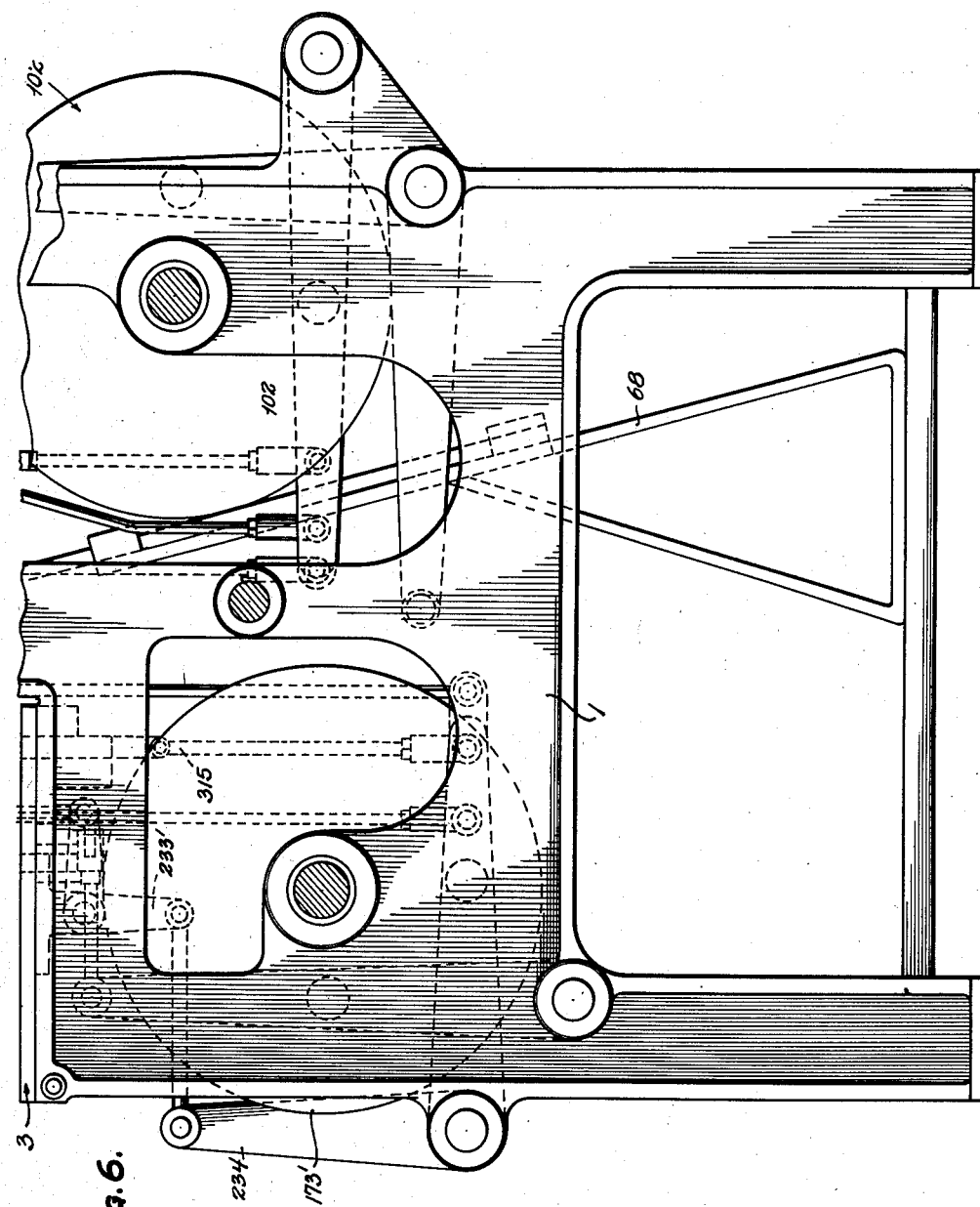
Figure 7:
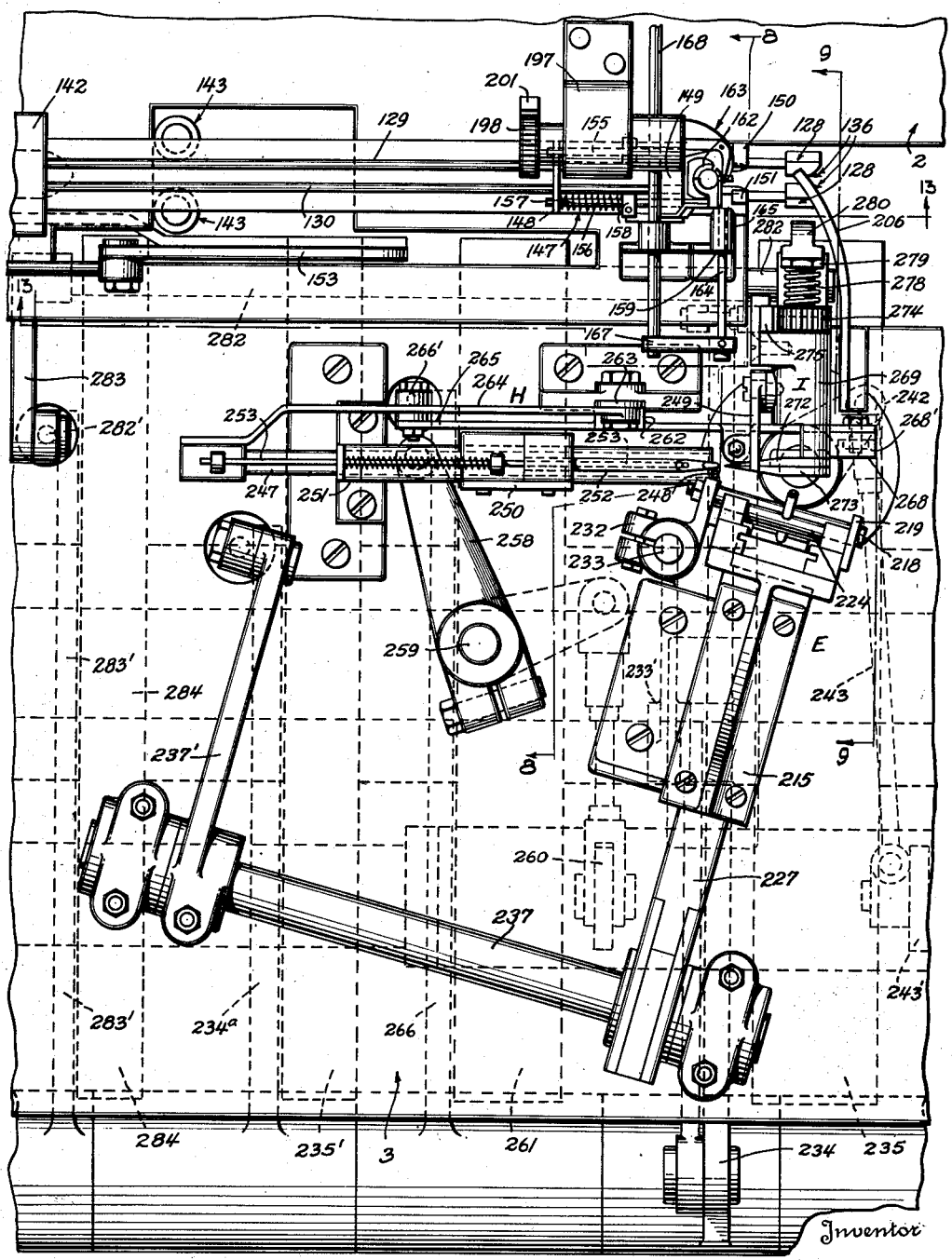
Figure 8:
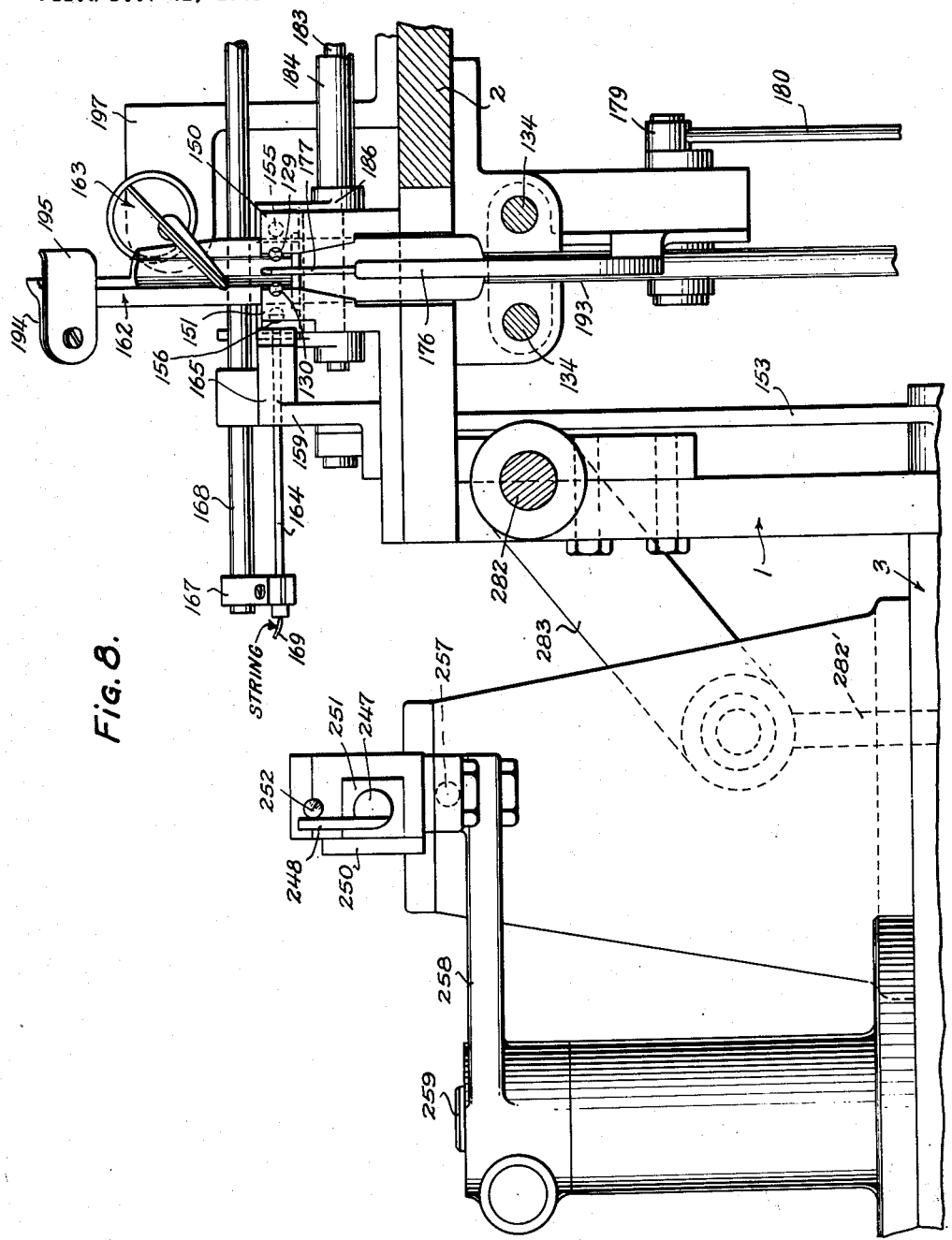
Figure 9:
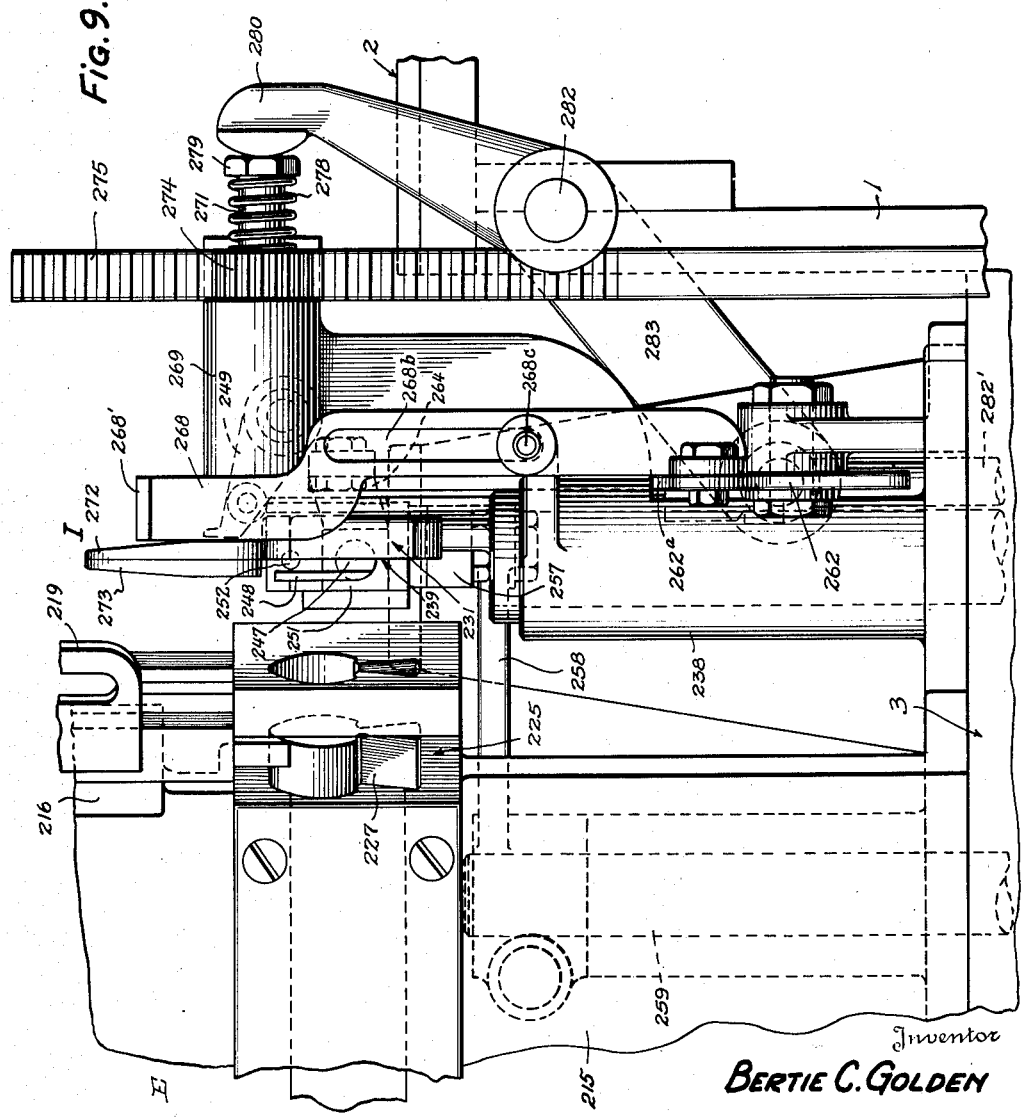
Figure 10:
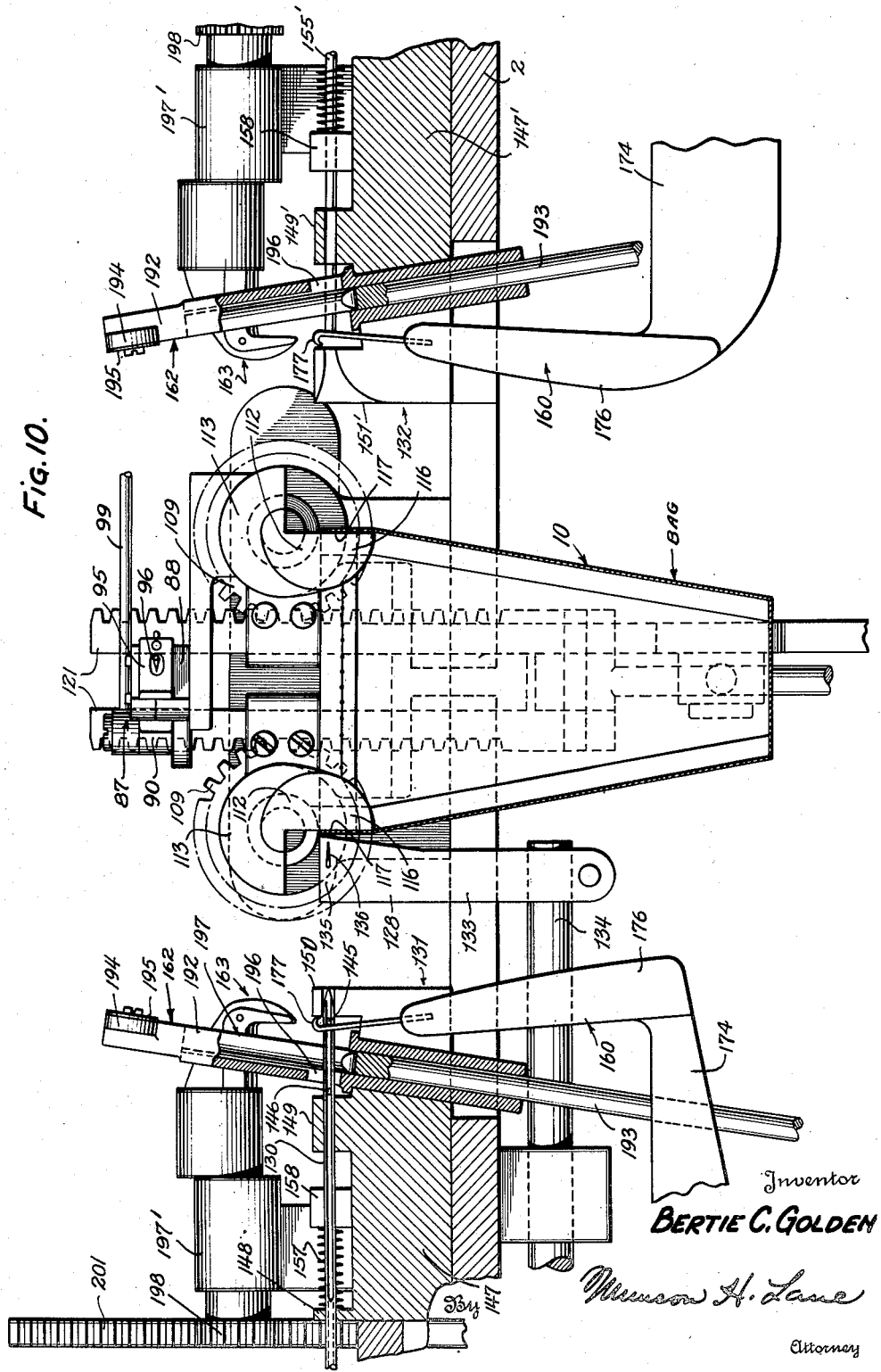
Figure 11:
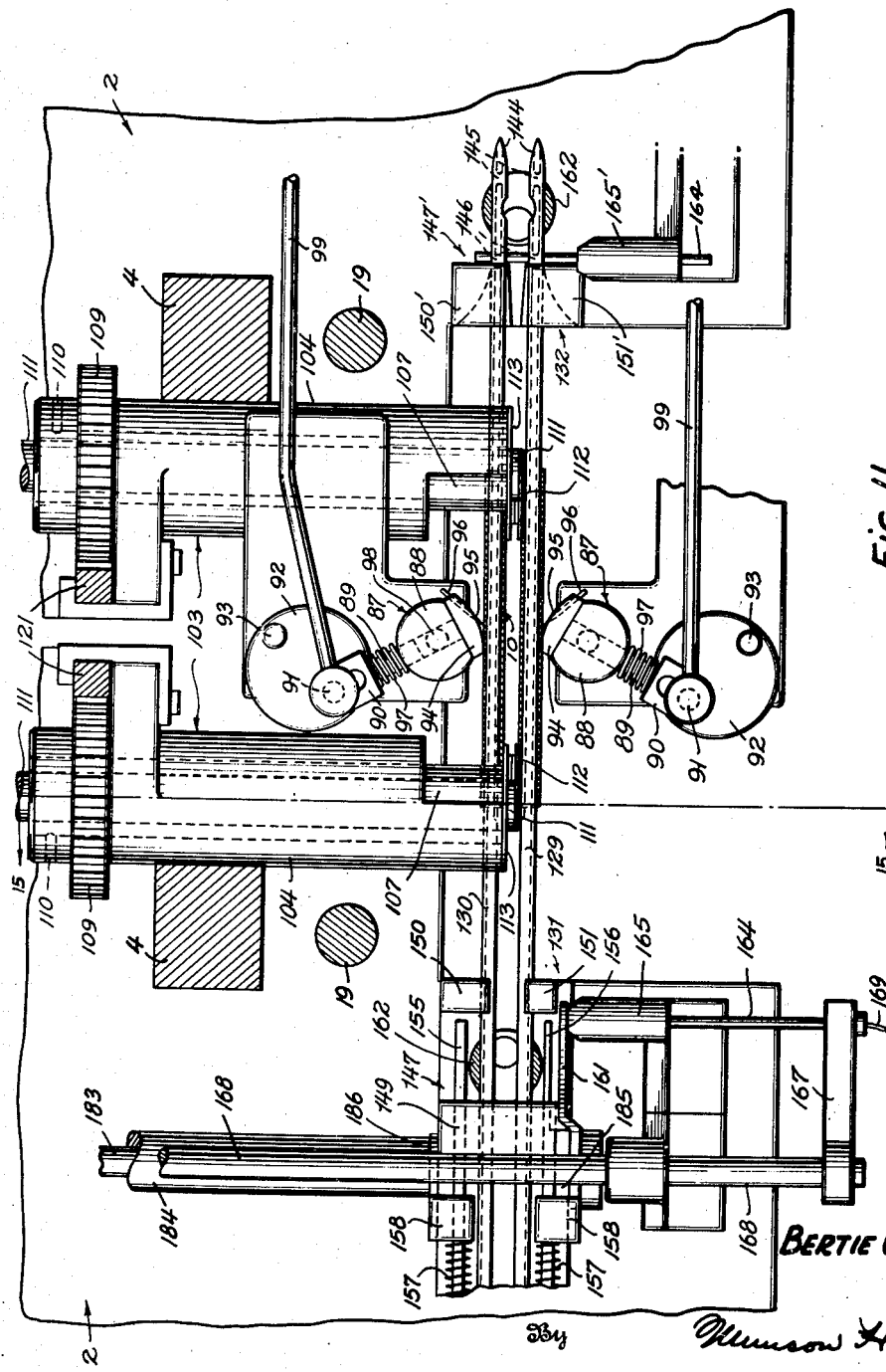
Figure 12:
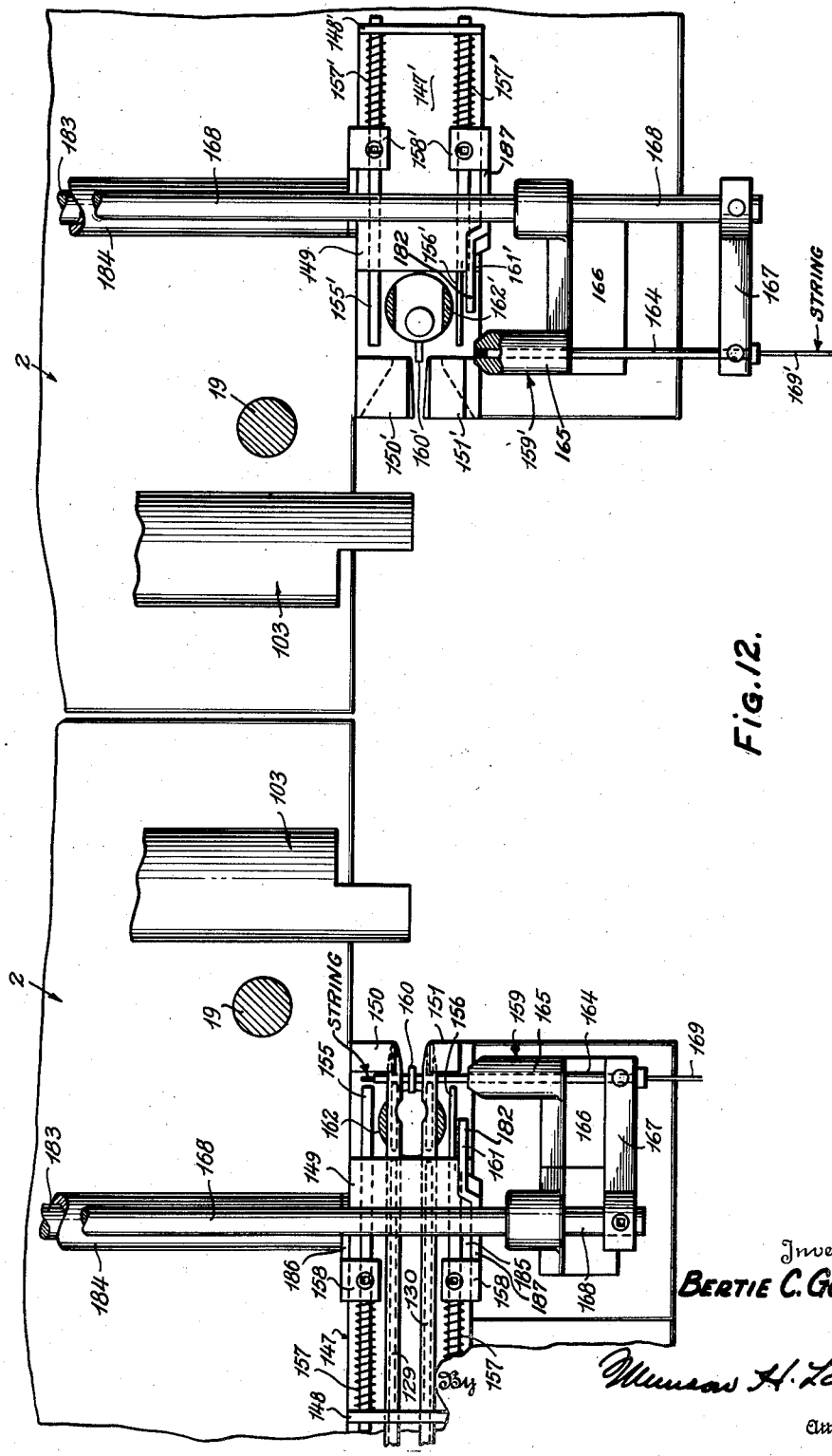
Figure 13:
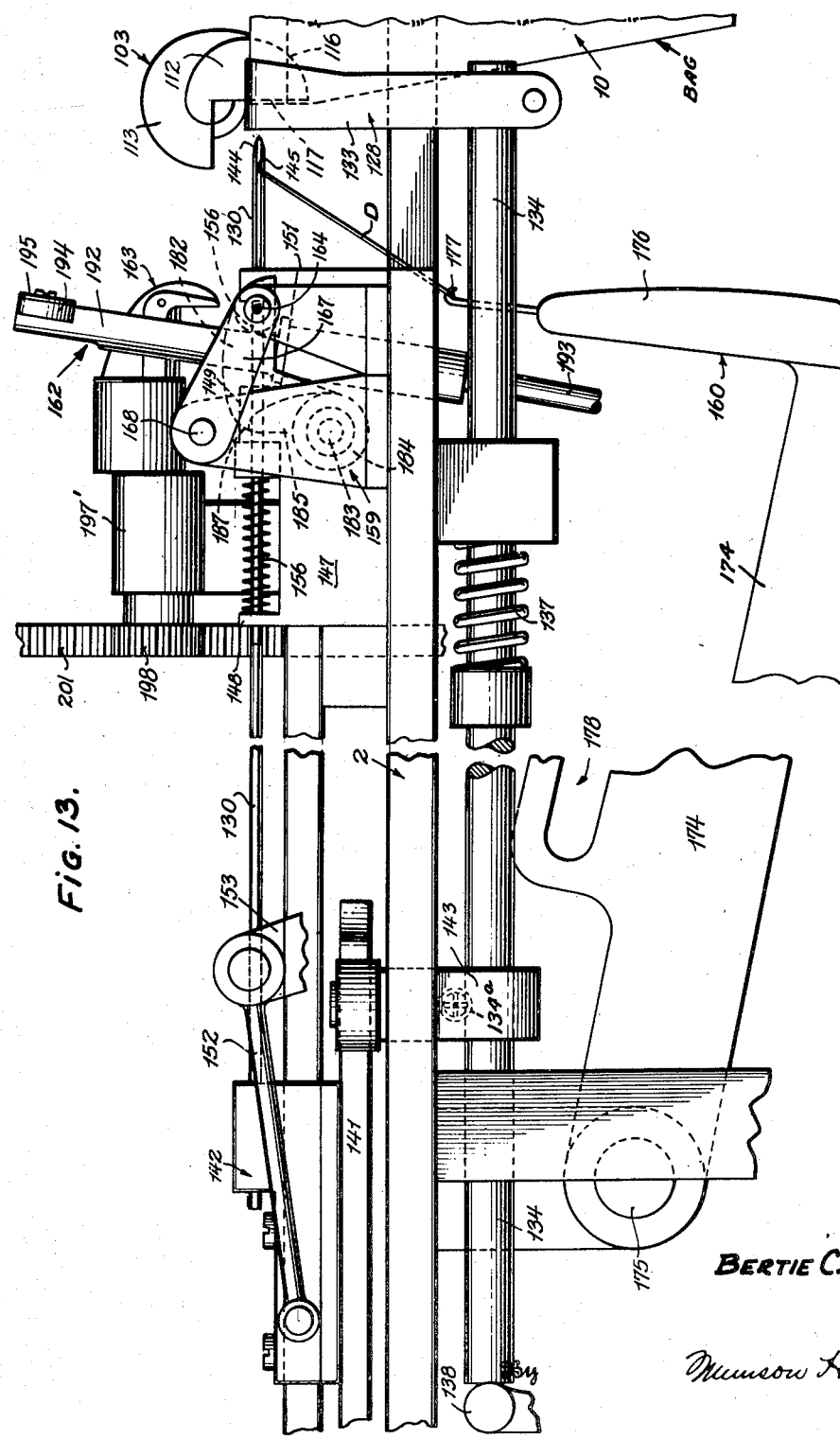
Figure 14:
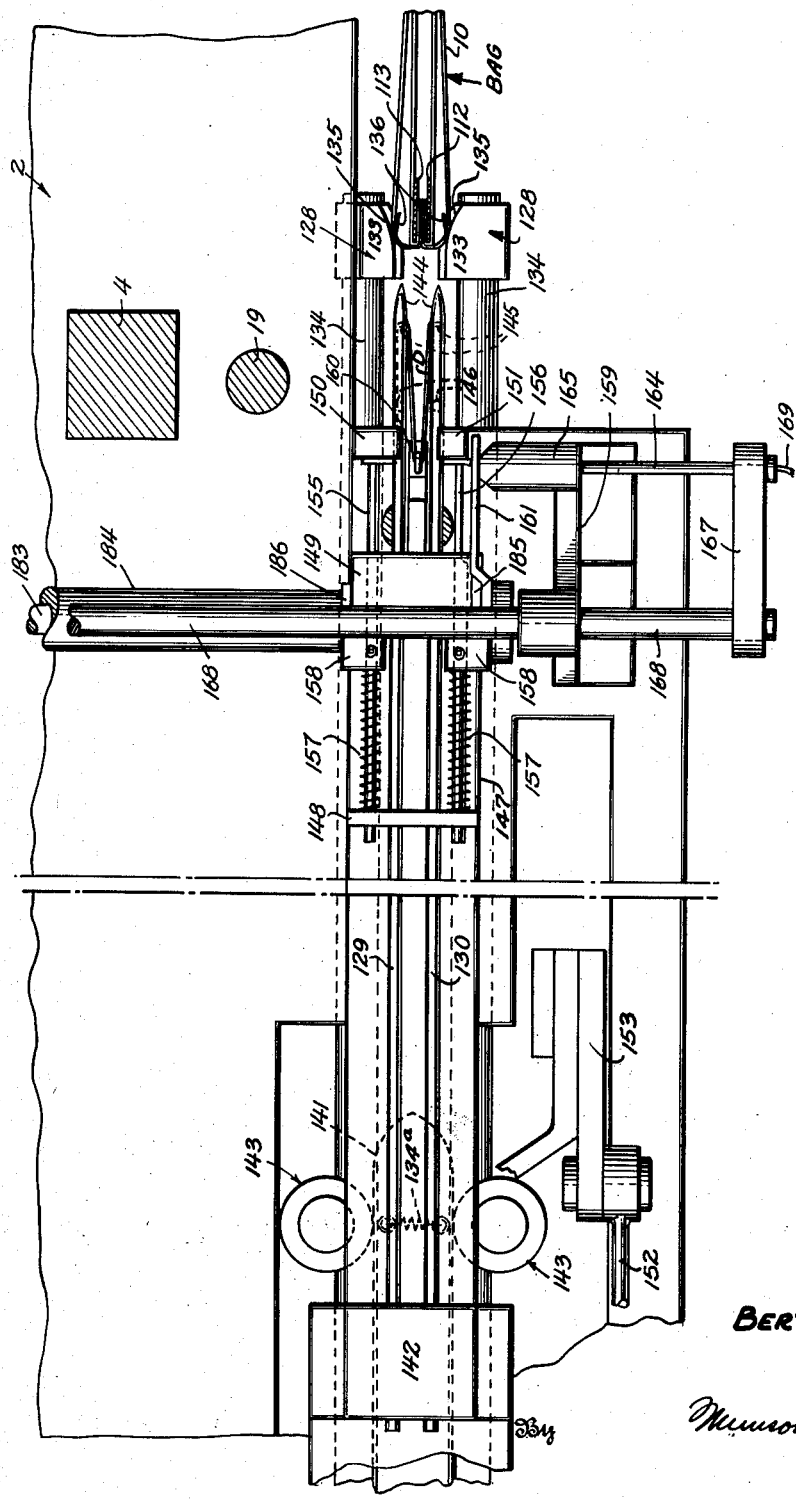
Figure 27:
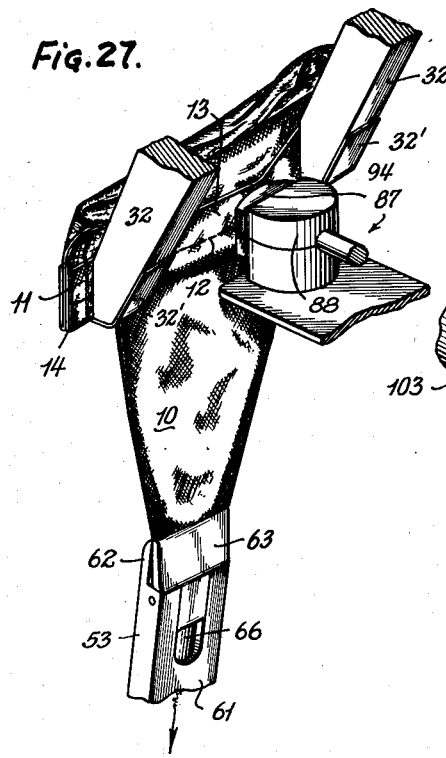
Figure 28:
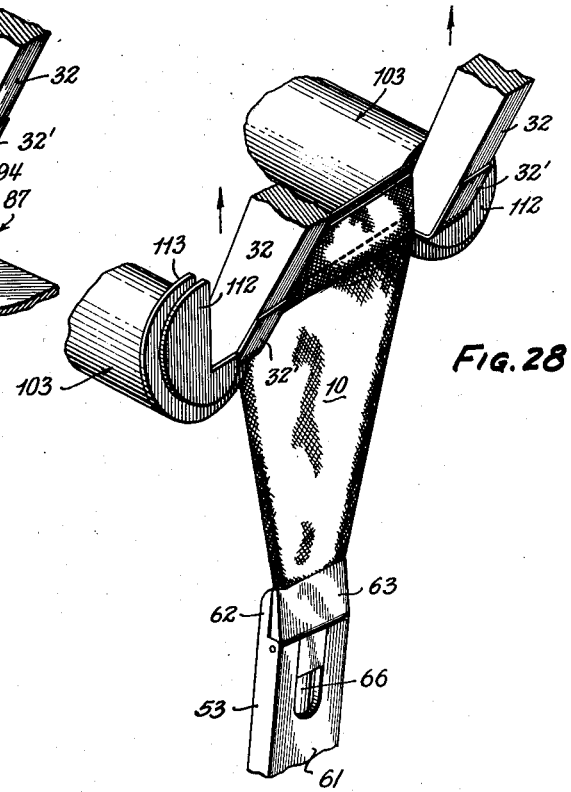
Figure 29:
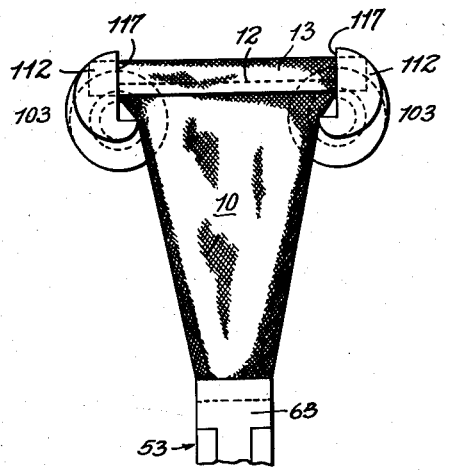
Figure 30:
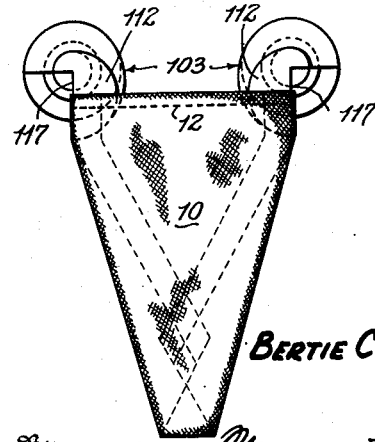
Figure 40:
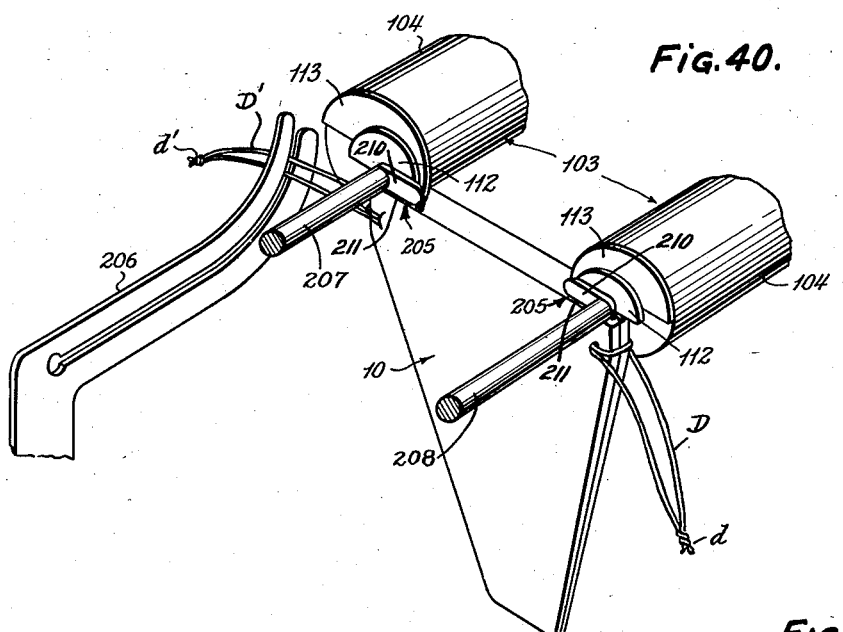
Figures 41, 42:
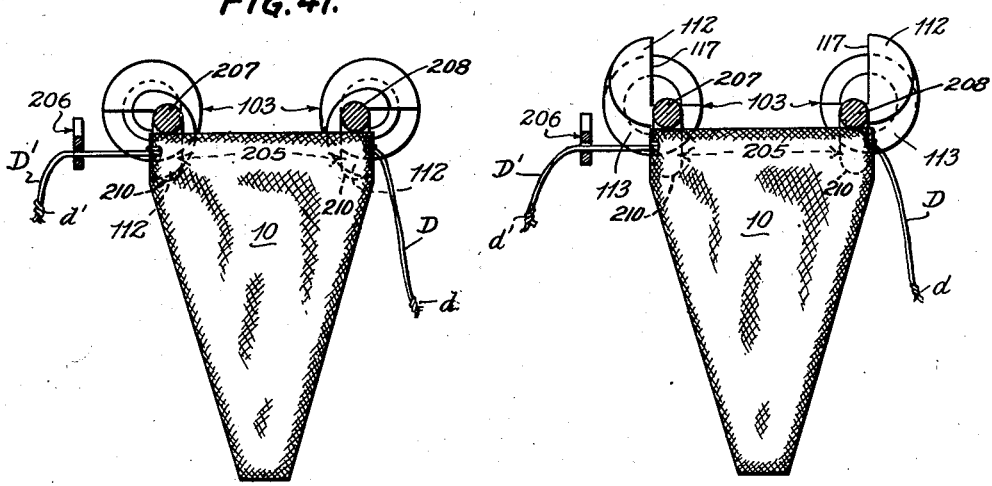
Figure 43:
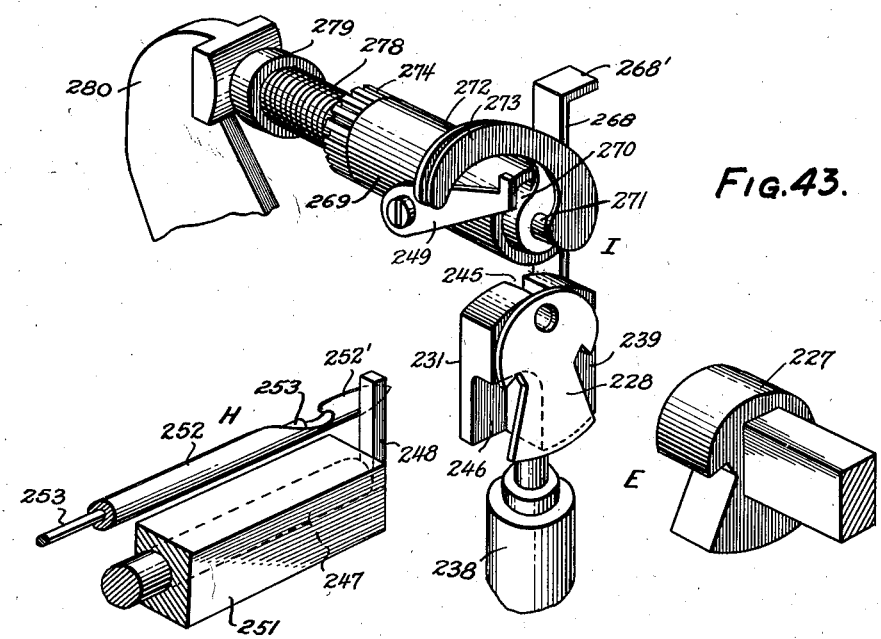
Figure 44:
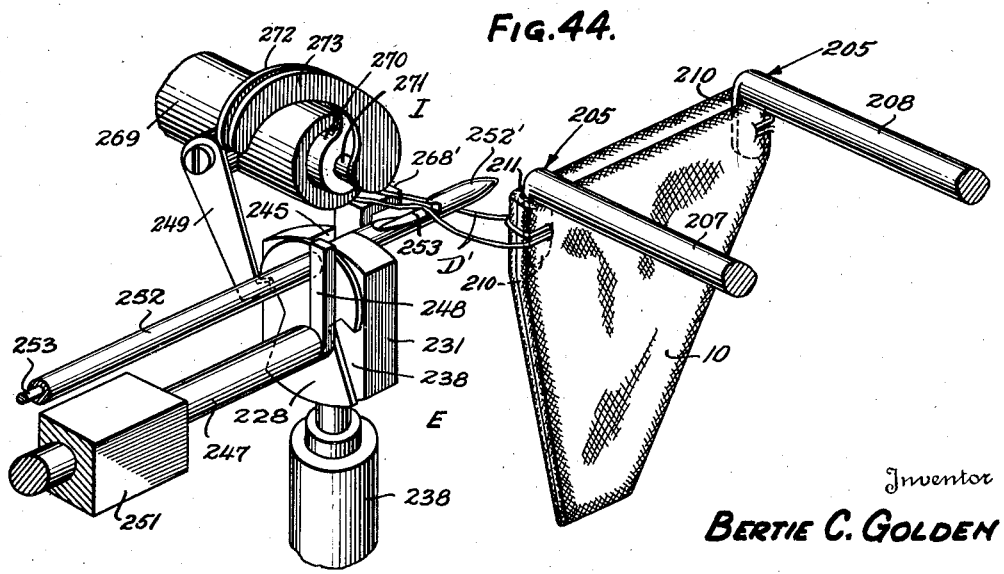
Figure 47:
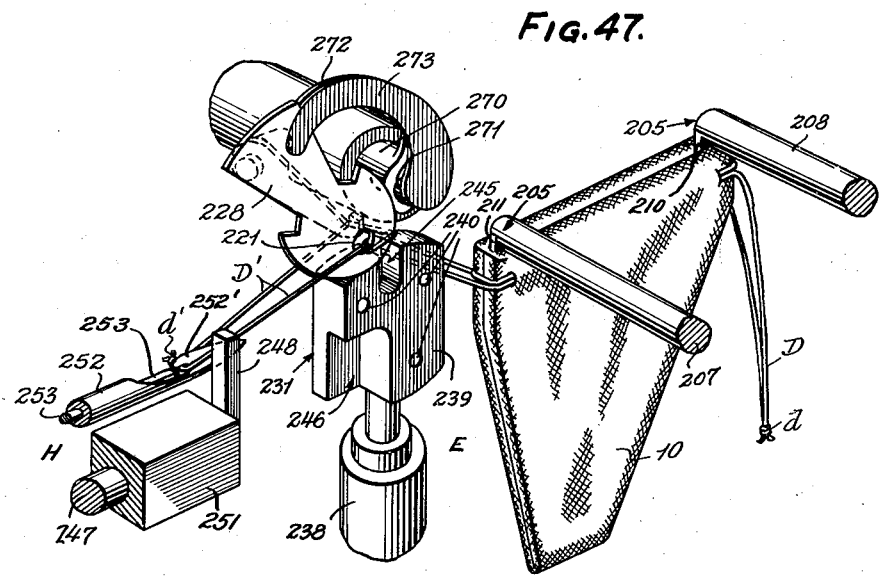
Figure 48:
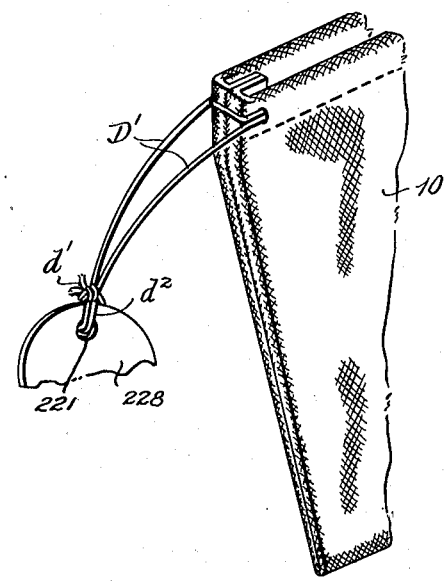

The shaft 29 comprises two slidably connected sections feathered to each other and fixed to the blocks 22 and 23 respectively, while the shaft 31 comprises two sections feathered to each other, as best shown in Fig. 18. The outer end of one of the sections of the shaft 31 has a crank portion 33' which is journaled in the bracket arm 24, Fig. 5 is a vertical sectional view, with the bag stacking mechanism omitted, and taken substantially on the line 5—5 of Fig. 3;

Fig. 6 is a side elevational view of the frame and certain parts of the bottom half of Fig. 1;

Fig. 7 is an enlarged fragmentary top plan view showing to better advantage the bag stringer, knotter, string delivery means, tagger and tag punching mechanism;

Fig. 8 is a vertical sectional view taken substantially on the line 8—8 of Fig. 7;

Fig. 9 is a sectional view taken substantially on the line 9—9 of Fig. 7;

Fig. 10 is a horizontal sectional view showing to better advantage the construction of the draw string needles, knotters, string measuring arms, bag corner grippers and hem punching mechanism;

Fig. 11 is a plan view of that part of the machine shown in Fig. 10 with the bag stringing needles shown as having moved completely through the bag and about to be withdrawn through the same;

Fig. 12 is a similar view to Fig. 11 showing the bag stringing needles retracted and the string delivery means operated and threading the string through the eyes of said needles;

Fig. 13 is a sectional view taken substantially on the line 13—13 of Fig. 7 showing to better advantage the string cutting knife, bag stringing needles and their operating mechanism, string measuring arm and the hem punching head and its operating mechanism;

Fig. 14 is a top plan view of the mechanism shown in Fig. 13 showing to better advantage the operation of the string measuring mechanism and the hem punching heads moved into position to penetrate the bag hem and spread so as to allow free passage of the needles therethrough;

Fig. 15 is a sectional view taken substantially on the line 15—15 of Fig. 11;

Fig. 16 is a section on the line 16—16 of Fig. 15;

Fig. 17 is a plan view of the bag feeder grippers, severing means, and their operating mechanism;

Fig. 18 is a view similar to Fig. 17 omitting the severing mechanism and associated operating levers, with parts broken away to show adjustment features more clearly;

Fig. 19 is a sectional view on the line 19—19 of Fig. 17, showing the bag feeder grippers in open position;

Fig. 20 is a view similar to Fig. 19 showing the bag grippers in closed or gripping and delivery position;

Fig. 21 is a side elevational view of the tag feeding and punching mechanism and also showing the pneumatic head for holding the tag in position when the tag is looped onto the draw string;

Fig. 22 is a sectional view taken substantially on the line 22—22 of Fig. 21;

Fig. 23 is a diagrammatic view of the bag chain with bag feeder grippers gripping the same and about to be moved downwardly;

Fig. 24 is a diagrammatic view of the bag chain moved into severing position and showing the bag mouth openers operated, allowing reversing plunger to enter same and grip the bottom fold of the bag prior to reversing same;

Figs. 25 and 26 are sectional views of the head of the reversing plunger in its operating positions;

Fig. 27 is a view showing the bag being reversed;

Fig. 28 is a view showing the bag fully reversed, with corner grippers about to grip the corners of the bag;

Fig. 29 is a view showing the corner grippers holding corners of the bag and about to reverse the same;

Fig. 30 is a view showing the corner grippers rotated and the bag and its corners reversed;

Fig. 31 is a view showing the corner grippers holding the bag in position to receive the hem punched with the hem punch entering the hem of said bag;

Fig. 32 is a view showing the hem puncher operated to stretch the hem open with the draw string needles about to enter the hem of the bag;

Fig. 33 is a diagrammatic view showing the string feeding, gripping and measuring mechanism in string feeding position;

Fig. 34 is a view similar to Fig. 33 showing the parts in string measuring position;

Fig. 35 is a view similar to Figs. 33 and 34 showing the parts in string severing position;

Fig. 36 is a diagrammatic view showing the draw string needles inserted partially through the hem of the bag and the draw string being threaded through the same;

Fig. 37 is a view similar to Fig. 36 showing the needles passed completely through the bag and the ends of the draw string about to be knotted;

Fig. 38 is a view similar to Fig. 37 showing the needles rethreaded with a second draw string and about to be withdrawn through the hem of the bag;

Fig. 39 is a view similar to Fig. 38 showing the needles moved partially through the hem of the bag on the return stroke carrying the second draw string and showing the first draw string projecting beyond the edge of the bag with its free ends tied in a knot;

Fig. 40 is a diagrammatic showing of the bag with completed draw strings and the bag stacking grippers about to enter the mouth of the bag;

Fig. 41 is a view showing the bag stacking grippers rotated within the mouth of the bag so as to grip same from within;

Fig. 42 is a view showing the bag stacking grippers supporting the bag with the bag corner grippers released;

Fig. 43 is a diagrammatic showing of the tag punching head in position taken immediately after delivering a tag to the pneumatic head and with the string gripping needle, presser foot and tag gripper in position about to be operated;

Fig. 44 is a diagrammatic showing of the pneumatic head, needle and presser foot operated to draw the string through the tag;

Fig. 45 is a view similar to Fig. 44 showing the string being pulled through the tag with the presser foot holding the tag against the pneumatic head, the hook of the needle in this position being closed by a spring operated plunger;

Fig. 46 is a view similar to Fig. 45 showing the string passed completely through the tag and pneumatic head rotated to position the tag within the path of the tag gripper, which has been rotated downwardly between the loop of the draw string and gripping tag;

Fig. 47 is a view similar to Fig. 46 showing tag grippers rotating to pull the tag through the loop of the draw string;

Fig. 48 is a view showing the tag completely looped through the draw string and securely fastened to the same;

Fig. 49 is a top plan view on an enlarged scale showing the bag stacking mechanism and illusand the outer end of the other section of the shaft 31 has a crank portion 34 which is journaled in the bracket arm 25 and terminates in a crank arm 35 having a free end carrying spaced rollers 36. (See Figs. 17-20.) The rollers 36 receive between them a vertically disposed crank rod 37 which is fixed to and receives motion from an oscillatory shaft 38, whereby the grippers 32 may be thrown into and out of action, and said rollers are adapted to travel upward and downward on the rod 37 in the upward and downward travel of the carriage 21. The plate or platform 28 is fixed at one end by the bolt 27 to the bracket arm 25, while the opposite end of the plate is formed with a longitudinal slot 39 receiving the bolt 26 by which it is adjustably connected with the bracket arm 24. This construction and that of the telescopic shafts 29 and 31 permits the brackets, their carrier blocks 22 and 23, and consequently the gripper arms of each set of gripper arms, to be adjusted to vary the distance between the right and left hand grippers of each set to adapt them for action on bags of different widths within a predetermined limit. This adjustment is conveniently effected by loosening the bolt 26 and spreading the uprights 4 and rods 19 a greater distance apart or bringing them closer together and then tightening the bolt 26 to fix the brackets in adjusted position. It will be observed that the table 2 and portions of the guideway 6 lying on opposite sides of their longitudinal centers are divided (Fig. 2a), or each formed of two sections, and in practice the two sections of the table 2 are adjustably secured by suitable fastenings to the frame 1, so that adjustment of the parts above described may be most conveniently effected, when the respective fastenings are loosened, by lateral adjustment of the sections of the table 2, whereupon by tightening the fastenings the parts will be fixed in adjusted position. The construction and arrangement of all cooperating and succeeding parts of the bag feeding, reversing and drawstring mechanisms of the machine may be such that these parts will be correspondingly adjusted if required for proper action on bags varying in width within the predetermined limits.

Fig. 1 shows a lowered or advanced position of the carriage 21 at a predetermined distance downward from station A, to which advanced position the carriage is moved to feed a bag (which has been engaged by the feed grippers at station A) to bag reversing and drawstring threading mechanism located at the lower end of the guideway 6. The arrangement is such that when the foremost bag of the chain is fed downward to this advanced position, at which time it is brought into the zone of the grippers of the reversing mechanism, the next succeeding bag of the chain will be disposed at station A and the connecting side seams between these bags will be in position for the side seam threads to be cut by the severing mechanism to separate the foremost bag from the succeeding bag. The severing mechanism employed for this purpose is mounted on the carriage 21, together with the plunger gripper means of the bag reversing mechanism, the construction and arrangement of which parts will now be described.

*Severing mechanism*

The severing mechanism (Fig. 17) comprises two scissors units 40 and 41 mounted on the plate 28, and each consists of two pivotally connected blades, said units being so spaced as to cut the side seam threads 11 (Fig. 24). Two of the blades of the units are coupled by a connecting link 42, and the other blades of the units are coupled by a connecting link 43, whereby the blades are adapted to be opened and closed in unison. Connecting rods 44 and 45 connect the scissors units with the opposite ends of a centrally pivoted actuating lever 46 (see Fig. 2) mounted to rock on the extension arm 28' which is fixed to and movable up and down with the carriage 21. One end or arm of this lever carries a ball or spherical head 47 (Fig. 17) pivotally engaged by a fork 48 on an oscillatory crank arm 49 by which, through opposite oscillatory movements of said crank arm, the lever 46 will be rocked to actuate the scissors.

*Plunger gripper*

Mounted on the carriage 21 is a guideway 50 (Figs. 5, 24-26) in which is slidable a plate 51 provided at its lower end with a tongue 52 for coaction with a bag reversing plunger gripper 53. When the foremost bag 10 is brought to the advanced position above described the bottom of said bag is pressed downwardly and inwardly by the tongue 52 to form a tongue or tuck 54 in the bag, as shown in Figs. 24, 25 and 26, for engagement by the plunger gripper 53 to turn the bag right side out. The plunger gripper 53 in this action enters the open end of the bag 10 from below and firmly grasps the tongue fold or tuck 54 to pull the bag right side out when the side seam threads 11 between the foremost bag and the next succeeding bag are severed. Plate 51 carries a pin 55 (Fig. 2a) projecting outwardly through the guideway 50 and engaging a cam slot 56 in an arm 57 projecting from a lever 58 pivoted at its lower end to the guideway, as at 59, and coupled at its upper end by a link 60 (Fig. 2) with the lever 46 so that when the lever 46 is operated to actuate the scissors 40 and 41 the tongue plate 51 will be operated to form the tongue or tuck 54 in the bag just prior to the cutting of the side seam threads by the scissors.

The plunger gripper 53 (Figs. 24-26) comprises a bar 61 whose upper end carries a stationary jaw 62 and a pivoted jaw 63 for coaction therewith. When the bar 61 is moved forward into the bag the jaw 63 is adapted to be opened by pressure of the tongue 52 and tuck 54. The jaw 63 has a beveled portion 64 which is engageable by the beveled or angular face 65 of a rod 66 lying in a slot 67 in the bar 61, whereby at the proper movement the jaw 63 is clamped firmly down on the tuck 54. When the plunger gripper is projected into the bag the rod 66 is first retracted sufficiently to permit the jaw 63 to open to receive the tuck 54, after which the rod is moved forwardly to close the jaw and hold it closed while the bag is being turned right side out on the reverse motion of the plunger gripper.

The plunger gripped bar 61 and rod 66 are slidably mounted on a guide or track bar 68 (Fig. 2a) fixed to the machine frame 1, as indicated at 69 (Fig. 5; see also Fig. 6). The actuating means for conjointly reciprocating the gripper bar 61 and rod 66 comprises a link 70 connected at one end to a guide block or sleeve 71 fixed to the lower end of the bar 61 and slidable on the bar 68, the other end of the link being connected to a bell crank lever 72 pivoted to the frame 1 at 72' and carrying a roller 73 engaging a groove in an operating cam 74. The bar 61 slidably engages a guide block or sleeve 71' fixed to the bar 68 adjacent its upper end, the bar 61 thus being mounted for rectilinear travel on the bar 68 toward and from station A for coaction with the tongue 52 of the tongue plate 51. The bar 61 and rod 66 are, as above described, movable together toward and from the tongue plate, but the rod 66 is also independently movable forwardly and rearwardly on the bar 61 for coaction with the gripper jaw 63. As shown in Fig. 2a the rod 66 is disposed in the slot 67 between portions 66' and 67' of the bar 61, in which the ends of the rod are slidably fitted and through which they extend. The forward end of the rod 66 having the beveled extremity 65 projects beyond the guide portion 66' for coaction with jaw 63, while the rear end of the rod 66 projects beyond the guide portion 67' for pivotal engagement with one arm of a bell crank lever 75. The rod 66 is normally held retracted against the pressure of a coiled spring 76 disposed about it between the guide portion 67' and a collar 75' adjustably secured to the rod. The other arm of the bell crank lever 75 is provided with an anti-friction roller 77 and is adapted for cooperation with combined cam and keeper plates 77' and 78 respectively fixed to the bar 68. Spring 76 tends to project the rod 66 forward to the position shown in Figs. 25 and 26 in which it locks the jaw 63 in closed position, but the rod is adapted to be moved rearwardly to jaw releasing position by means of the lever 75 and coacting cam plates 77' and 78. Normally, or when the plunger gripper 53 is retracted, the rollered arm of lever 75 lies between the guide member 71 and cam plate 77', into which position it is forced by the plate 77' when the plunger gripper is moved rearwardly to cause the rod 66 to be retracted against the resistance of its spring. A similar retraction of the rod 66 occurs when the plunger gripper is moved to a position near the end of its forward traverse and the rollered arm of lever 75 engages the cam plate 78 and is swung inwardly thereby and assumes a position between the bar 68 and plate 78. Thus it will be understood that when the plunger gripper is moved forwardly for coaction with the tongue plate 51 and reversing grippers the rod 66 will be released for movement to locking position by disengagement of the lever 75 from the cam plate 77', but as the plunger gripper nears the tongue plate, lever 75 will be engaged with the cam plate 78, whereby the rod 66 will be retracted to allow jaw 63 to open for the entrance of the tongue 52 of the tongue plate between the jaws 62 and 63 and the pushing of the bag portion in between the jaws 62 and 63 to form the tuck. On the rearward movement of the plunger gripper and the return of the tongue plate to normal position, the tongue of the tongue plate is withdrawn from between the jaws but at its instant of withdrawal the lever 75 moves out of engagement with cam plate 78, whereupon the rod 66 is released and allowed to be operated by its spring 76 to close and lock the jaw 63 in gripping position. The parts remain in this position while the bag is reversed and until the plunger gripper is fully retracted and the lever 75 engages the cam plate 77', whereupon said lever will be operated to move the rod 66 to bag releasing position.

Operating mechanism

The mechanism for operating the carriage 21, the grippers 30 and 32, the cutters 40 and 41, and the tongue plate 51 comprises, in addition to parts above described, a lever 79 (Fig. 2a) coupled by a link 79' to the bars 19 of the carriage 21 and having a roller (not shown) engaging a groove in an operating cam 80. The groove in this cam is so formed as to impart to the carriage upward and downward movement at timed periods to shift the carriage to its different working positions. The oscillatory rod or shaft 38 which imparts the required rocking motions to the gripper shaft 31 is coupled by a crank connection 81 to a lever 82 having a roller engaging a groove in an operating cam 83 whereby said rod or shaft 38 is oscillated at proper timed periods. In the movements of the carriage the rollers 36 travel up and down on the crank rod 37, as previously explained. The crank arm 49 (Figs. 2a and 17) which operates the cutters 40, 41 and the tongue plate 51 is carried by a vertically disposed oscillatory rod or shaft 84 which is coupled by cranks 85 to a lever 86 having a roller which engages a groove in the operating cam 83 whereby the cutters 40 and 41 and the plate 51 are operated in timed accord with each other and with the gripping rollers 30 and 32 and the plunger gripper 53 and its clamping rod.

Mouth spreaders

To facilitate entry of the gripper bar 61 of the plunger gripper 53 into the bag while the mouth of the latter is clamped inside of the hem margins 14 by the grippers 30 and 32 (Figs. 23 and 24), two pin actions or mouth spreaders 87 of the construction best shown in Fig. 11 are employed. (See also Fig. 10.) Each of these comprises a head 88 slidably and non-rotatably mounted on a carrier pin 89 projecting from a bracket 90 mounted by a fastening pin or bolt 91 on an eccentric or cam disk 92 pivotally mounted, as at 93, upon the table 2 or other fixed part of the machine. Each head 88 has fixed thereto a needle carrier block 94 having a contact face 95 and a bore in which is fitted a needle 96 projecting just beyond and inclined obliquely to the contact face. Disposed about the pin 89 between the head 88 and bracket 90 is a coiled locking spring 97 which presses the head outward to the limit allowed by a stop pin 98. The spreaders or pin actions are arranged on opposite sides of the mouth of the fed-up bag and are adapted to be swung in opposite directions on arcs causing the pins to penetrate the hems 13 and spread the same or pull the mouth of the bag open between the points engaged by the grippers 30 and 32, as shown in Figs. 24 and 27, thereby permitting the plunger gripper bar 61 to pass freely into the bag to grip the same for the reversing action. The spreaders are so movable from the normal position shown in Fig. 11 and back to such normal position again. The spreaders remain in engagement with the bag until it is reversed, as shown in Fig. 27. During this reversing action of the bag the operating heads 88 may yield outwardly against the resistance offered by their springs to compensate for and accommodate themselves to the change in thickness of the bag at the mouth, which becomes four-fold instead of two-fold. By this means possible tearing or other damage to the bag is prevented during reversal of the bag or withdrawal and movement of the spreaders 87 back to normal position. The spreaders are coupled by connecting rods 99 to a bell-crank lever 100 (Fig. 2) coupled in turn to a lever 101 having a roller engaging a groove in an operating cam 102, by which said spreaders are operated in unison and in timed accord with coacting parts of the machine.

Reversing grippers

At the end of the bag body reversing action and as the bag is about to be released by the feed grippers 30 and 32, the bag is engaged by bag mouth reversing or corner grippers 103 which turn the hemmed portions and corners of the bag mouth in and hold the bag mouth open while hem nickers 128 (Figs. 10, 14 and 31) are operating to form needle entrance openings in the hems, and while the needle mechanism is acting to thread drawstrings through the hems. Figs. 28 to 42, inclusive, show the stages of operation beginning with the engagement of the bag by the bag mouth reversing grippers and ending with the removal of the bag therefrom by take-off or stacking grippers 205 after the drawstrings have been threaded through the hems by the needle mechanism.

Fig. 28 illustrates the reversing or corner grippers 103 positioned to receive the foremost bag in the chain upon advancement of the carriage 21 and reversal of the bag body by the plunger gripper 53. The reversing grippers 103 are identical in construction and operation, so that a description of one will suffice for both. Figs. 15 and 16 illustrate one of the reversing grippers in longitudinal and transverse section, which gripper comprises a tube 104 having a flange 105 fixed to a part of the table structure 2 by fastening screws 106. Inside the tube 104 is rotatably disposed a hollow shaft 107 extending through a bore 108 in the tube and carrying a pinion 109 secured thereto by a set screw 110.

An inner solid shaft 111 is slidably guided by the hollow shaft 107 and is provided with a lip 112 arranged to move toward the flap 14 of the bag 10 to clamp the flap against a lip 113 on the upper end of the hollow shaft 107. Lip 113 rides on the adjacent end of the tube 104 and is rotatable with the shaft 107 through the medium of the pinion 109. Hollow shaft 107 has a slot 114 for the reception of a key 115 fixed to the inner shaft 111 so that the latter is feathered to the hollow shaft 107 for rotation therewith, but may be moved longitudinally of the hollow shaft 107 for spacing the lip 112 from the lip 113 so as to facilitate entrance of the bag flap 14 therebetween.

Fig. 27 illustrates the plunger gripper 53 in a retracted position short of its extreme retracted position, and Fig. 28 shows the plunger gripper fully retracted. Fig. 28 also shows the reversing grippers 103 in their retracted position or starting point in their path of rotation in which their spread lips 112 and 113 are disposed to grip the end margins of the hems of the bag beyond the grippers 30 and 32 prior to the retraction of the latter. Fig. 29 shows the reversing grippers partly rotated to grip the end margins of the hems and to hold the mouth end of the bag on the release of the grippers 30 and 32 and while the plunger gripper 53 is making its final movement and the hems are still turned out. As the plunger gripper 53 makes its final movement in its direction of retraction the reversing grippers 103 are rotated from the position shown in Fig. 29 to that shown in Fig. 30, whereby the bag hems are turned upward and inward and the upper corners of the bag turned inward and the mouth of the bag held fully open. In the position of Fig. 30 the bag and the reversing grippers 103 are fully reversed and the plunger gripper 53 fully retracted or released, but the reversing grippers retain their grip on the bag until the drawstrings have been incorporated in the two hems 13 of the bag. Figs. 31 and 32 illustrate the bag in its drawstring threading position, which conforms to the position of the bag shown in Fig. 30. It will be noted that the lips 112 and 113 have nose portions 116 which extend under the hem ends gripped by the lips in the position shown in Figs. 30 and 31, and that the lips have straight edges 117 which lie substantially in the line of the side seams 11 to grasp the hem ends closely adjacent the grippers 30 and 32. The edges 117 accordingly when disposed in the position shown in Fig. 30 will lie inside the bag and act to move the upper corners of the bag outward and to hold the bag mouth open or with its hems spread apart to facilitate the threading of the drawstrings through the hems. As shown in Fig. 15, a collar 118 is secured to the shaft 111 by a set screw 119, and between said collar and the pinion 109 a compression spring 120 is interposed which holds the lip 112 pressed against the bag flap with sufficient force to secure a firm grip on the flap.

The means for rotating the reversing grippers 103 comprises a double rack 121, Figs. 2, 3, 10 and 11, which is arranged in mesh with the two pinions 109. Since each pinion is connected with one hollow shaft 107, the two hollow shafts of the reversing grippers will be rotated simultaneously in opposite directions to turn the grippers in the direction of the arrows shown in Figs. 28, 29 and 30, and rotate them thereafter back to their normal positions. The rack 121 is slidably supported on the frame 1 or table 2 and is coupled at one end by a rod 122 (Fig. 2) to a lever 123 having a roller to engage a groove in an operating cam 124, whereby reciprocatory motion is imparted to the rack. The shafts 111 (Figs. 5 and 15) have their rear ends arranged in the path of a presser head or fingers 125 adapted to slide the shafts 111 against the resistance of the springs 120 to open the lips 112 for a clamping action, the springs acting on the shafts to normally hold said lips 112 closed. The presser head or fingers 125 are operative through a link connection 126' with a lever 126 (Fig. 2) carrying a roller to engage a groove in an operating cam 127 whereby the lips or gripping elements of the grippers 103 are controlled.

Hem nickers

Figs. 31 and 32 illustrate the bag 10 in the drawstring threading position and particularly illustrate the operation of the hem nickers or piercers 128 adapted to penetrate the hems to facilitate the entrance of the drawstring needles 129 and 130. In the threading position the bag 10 is brought to lie between blocks 131 and 132 (Figs. 10 and 11) defining a threading pathway across which the needles reciprocate to thread a first drawstring through the hems in one of their directions of movement, and to thread a second drawstring through the hems in their reverse direction of movement. While the bag 10 is supported in position by the grippers 103 the piercers 128 come into action to pierce the hems just prior to the entrance of the needles on their first drawstring threading action. The piercers 129 are arranged at the starting side of the pathway, between the block 131 and the supported bag and comprise two needle carrying members or heads 133 mounted at their lower ends on longitudinally movable and rockable shafts 134 and having their upper ends arranged to lie on opposite sides of the bag in proximity to the adjacent side seam. The said upper ends of the members 133 are provided with inner bearing faces 135 beveled or extending obliquely away from the sides of the bag in the direction of forward travel of the needles and provided with pointed piercing elements or needles 136 extending therefrom in said direction of travel of the needles at a slight inward angle and in spaced relation to the beveled surfaces. Normally the piercers 128 are positioned adjacent the path of travel of needles 129, 130 out of contact with bag 10 as shown in Fig. 10, and are adapted to be first moved forwardly by forward sliding motion of their shafts 134 to cause the piercing needles 136 thereof to penetrate the hems 13, and then to be moved outwardly by rocking of their shafts 134 to effect a bulging or spreading of the layers of the hems 13 to permit stringing needles 129, 130 to enter the hems with ease (see Figs. 14, 31 and 32). By this mode of operation the needles of the piercers 128 are adapted to enter and leave the hems on substantially straight lines to avoid tearing of the hems or the formation of holes of any large size therein. This is important for the reason that the formation of large holes might allow such free movement of the adjacent end of the drawstring as to cause it to hook or lap over the adjacent end of the mouth, causing the latter to gap open and allow tobacco to escape in the use of the filled bag. The described mode of operation of the piercers 128 effectively avoids this objection.

The piercers 128 are normally held a working distance apart and their shafts 134 are held slidably retracted by coiled expansion springs 137 (Fig. 13). The shafts are adapted to be slidably moved forwardly by a bell-crank lever 138 (Figs. 2 and 13) coupled to a rod 139 having a roller engaging a groove in an operating cam 140. The piercers are adapted to be spread apart on each forward motion of the drawstring threading needles 129 and 130 and against tension of a spring 134ᵃ (Figs. 13 and 14) by a cam member 141 (Figs. 2, 13 and 14) mounted on the underside of the needle carrying slide 142 and engageable with arms 143 on the shafts 134 to rock them for a piercer spreading action. On the return motion of the needles 129, 130 and the cam 141 the shafts 134 and piercers 128 are returned to their normal positions by means of springs 134ᵃ and 137. As the needles 129 and 130 are advanced for threading the first drawstring through the two hems 13 their points will penetrate the hems on the other side of the bag without difficulty and without the aid of piercers or hem conditioning needles such as those described. The needles 129 and 130 will slide along the inner side walls of the hems so that they will penetrate the two hems on the other side of the bag closely adjacent to the side seam at that side.

Drawstring threading needles

The needles 129 and 130 (Figs. 2, 10, 11, 12 and 14) are adjustably fixed at their rear or butt ends to the slide or carriage 142 and have pointed front ends 144 and each is formed adjacent to its pointed end with a front eye 145 and a rear eye 146. The slide or carriage 142 is mounted on the table 2 at one (the left hand) side of the drawstring threading zone, and at that side a guide block 147 (Fig. 11) is arranged having guide members or abutments 148 and 149 (Figs. 12 and 13) through which the needles 129 and 130 are movable, and a pair of laterally spaced guide and clamping abutments 150 and 151 between which the needles are adapted to pass and which are grooved on their inner faces to guide the needles. At the opposite or right hand side of the drawstring threading space or zone is a guide block 147' having guide members 148' and 149' and a pair of laterally spaced guide and clamping abutments 150' and 151', the inner faces of which are flaringly recessed, Figs. 10 and 11. The carriage 142 is adapted to be reciprocated to move the needles 129 and 130 across the drawstring threading space through the medium of a link rod 152 (Fig. 2) coupled to a lever 153 which is in turn coupled to a rod or lever 154 having a roller engaging a groove in the cam 140.

Sliding clamping rods

Mounted on the block 147 at one side of the drawstring threading zone for cooperation with the needles and the guide and clamping abutments 150 and 151, are a pair of sliding clamping rods 155 and 156 (Figs. 11-14) which are arranged on opposite sides of the needles and guided by the guide members 148 and 149, each of which rods is encircled by a compression spring 157 normally urging it forward to clamping position, said spring being disposed between the guide member 148 and a head 158 on the rod. Similarly mounted on the block 147' at the opposite side of the drawstring threading zone for coaction with the needles and the abutments 150' and 151' are clamping rods 155' and 156' normally urged forward by similar springs 157' disposed between the guide member 148' and heads 158' on the rods.

Miscellaneous mechanism

Also arranged at the left hand side of the drawstring threading zone for cooperation with the needles, the abutments 150 and 151 and the rods 155 and 156 at that side is a needle threader 159 (Figs. 8, 11, 12 and 14), a drawstring pull out or measuring device 160 (Figs. 10, 13 and 14), a cutter 161 for severing a measured drawstring from a supply string, a string lifting and clamping device 162 (Figs. 8, 10 and 15) for clamping the ends of a second drawstring threaded by the needles through the hems of the bag, and a knotter 163 for knotting the ends of such drawstrings. Similarly there are arranged at the right hand side of the drawstring threading zone for cooperation with the needles, the abutments 150' and 151' and the rods 155' and 156' at that side, a needle threader 159', a drawstring pull out or measuring device 160', a cutter 161' for severing a drawstring from a supply string, a string lifting and clamping device 162', and a knotter 163', said clamping device and knotter being operative to respectively hold and knot the ends of a first drawstring threaded by the needles through the hems of a bag.

Needle threader

Each needle threader 159, 159' comprises a tube 164 movable transversely of the line of travel of the needles on the inner side of the abutments 150, 151, 150', 151', as the case may be, and reciprocable through a tubular guide 165 supported by a bracket 166. The threader tube is carried by an arm 167 fixed to an operating rod 168 slidably supported by the bracket. Through the threader tubes at the opposite sides of the drawstring zone pass strings 169, 169', supplied from suitable supply sources and from which the drawstrings are to be formed. Each needle threader operating rod 168 is actuated by an arm 170 (Figs. 3 and 5) on a shaft 171 having a crank coupled to a rod 172 having a roller operating in the groove of an operating cam 173.

*Thread measuring device*

Each pull out or measuring device 160, 160' comprises a lever 174 (Figs. 2 and 13) fulcrumed at one end to the frame or under side of the table 2, as at 175, and having at its free end an arm 176 provided with a hook 177 movable upwardly in rear of the abutments 150, 151, 150', 151', as the case may be, to engage a string threaded through the needles and pull the same downwardly to form a drawstring of measured length. (See also Figs. 10, 33 and 34.) Each lever 174 has a longitudinal slot 178 therein through which passes a bolt 179 to which is connected the upper end of a rod 180. The rod 180 of the device 160 at the left hand side of the drawstring threading zone is connected at its lower end to a lever 181 carrying a roller engaging a groove in the cam 173, whereby said left hand device 160 is operated. The rod 180 of the device 160' at the right hand side of the drawstring threading zone is connected at its lower end to a lever 181' carrying a roller engaging a groove in a cam 173' (Fig. 4), whereby said right hand device 160' is operated. The slot 178 permits adjustment of the bolt 179 longitudinally of the lever to adapt the stroke of the pull out device to be varied to form drawstrings varying in length, as will be readily understood.

*Thread cutter*

The thread cutter or severing device 161, 161' associated with each set of abutments 150, 151, 150', 151', and each set of rods 155, 156, 155', 156', and the coacting pull out device, comprises a vertically swinging cutter blade 182 (Fig. 13) fixedly mounted at one end on an oscillatory shaft 183 extending through a tubular oscillatory shaft 184. The blade is movable downwardly alongside the abutment 151 or 151', parallel with the clamping rod 156 or 156', as shown in Fig. 35, to sever a pulled out drawstring from the supply string fed up by a threader tube when the pulled out string portion is clamped by the rods 155, 156 or 155', 156', against the associated set of abutments 150, 151, 150', 151', as the case may be. Cams 185 and 186 (Figs. 11, 13 and 15) on the respective shafts 183 and 184 are engageable with the heads 158, 158' on the respective rods 155, 156, 155', 156', to hold the rods retracted against the action of their springs and to permit the rods to move forwardly to clamping positions when the shafts are oscillated in one direction and to effect reverse movement of the rods back to normal position when the shafts are oscillated in the reverse direction. Rod 156 is also adapted to be pressed back by a cam surface 187 (see Fig. 13) on the heel of the cutter blade to press said rod 156 back sufficiently for a quick string releasing action when the cutter has completed its cutting action and is being retracted and before the cam 186 acts to move rod 155 backward. The construction of the means for operating the cutter, the clamping rods and coacting parts at each side of the drawstring zone is the same in each case.

To shafts 183 and 184 are fixedly connected at one end levers 183' and 184', respectively (Figs. 2a and 3) arranged side by side and swingable in parallel vertical planes. Lever 183' is coupled at its opposite or free end to a rod 188 which in turn is connected to one arm of a bell crank lever 188' having a roller engaging a groove in an operating cam 190 on the main drive shaft. Lever 184' is provided with an integral arm 189 extending vertically above and below it, while arm 189 is provided with an arcuate slot 189ª. The lever 184' is also provided with an extension contact finger 189ᵇ projecting beyond the vertical arm 189 and substantially in alignment with the main body of the lever 184'. A bolt 183ª (Figs. 2a, 3 and 15) which couples the lever 183' to the rod 188 passes through the arcuate slot 189ª and has arranged thereon a spring 190ª which presses the lever 184' frictionally against the lever 183'. The finger 189ᵇ is movable between the table 2 and an adjustable stop 190ᵇ (Fig. 2a) on a bracket 190ᶜ fastened to the table 2. The cams 185 and 186 are so arranged on their shafts 183 and 184 as to operate the rods 155 and 156 at proper time periods. On the upward movement of rod 188 the levers 183', 184' will be conjointly moved, owing to their frictional engagement under pressure of the spring 190ª, until finger 189ᵇ engages the adjustable stop 190ᵇ, whereupon the upward movement of the lever 184' will be arrested at the time its cam releases the rod 155, but the upward movement of the lever 183' will be continued by movement of the bolt 183ª in the slot 189ª until it reaches the upper end of the slot, thus arresting the operating movement of the lever 183' at the time its cam releases the rod 156. The rods 155 and 156 will thus be released on a prescribed portion of the working movement of the cam slot 189ª for thread clamping operations at different properly timed periods. During the final period of the operation of cam 190 the rod 188 and levers 183', 184' are retracted, causing cams 185 and 186 to retract the rods 155, 156, one after the other, due to the slotted slip-joint or lost-motion connections 183ª, 189ª at proper time periods. The cam 187 (Fig. 13) on the heel of the cutter blade 182 comes into action as soon as the retracting movement of the blade begins, so as to cause rod 156 to quickly release the thread prior to the retraction of the said rod 156 by its retracting cam 186.

*Operation of drawstring needle mechanism*

The operation of the drawstring needle mechanism as thus far described for forming drawstring portions and threading the same through the hems of a bag is as follows:

Fig. 31 shows the piercers 128 inserted to form needle entrance openings in the hems, and Fig. 32 shows the needles 129 and 130 in position to enter the openings for threading a drawstring D formed from a string supplied by the feeder 159. Fig. 12 shows the start of the operation upon the threading of the front eyes of the needle with the threader 159 about to move backwardly and with the coacting puller in position to start the formation of a drawstring, while Figs. 13 and 33 to 39, inclusive, show succeeding stages of the threading operation.

Following the threading of the front eyes 145 of the needles, as the threader tube 164 begins its backward motion, clamping rod 155 is moved up to clamp the free end of the supply string 169 against the abutment 150. (See Fig. 33.) As the threader tube completes its backward movement and clears abutment 151, the pull out or thread measuring device 160 is moved downwardly to engage its hook 177 with the string between the abutments 150, 151 and to pull the string out to form the inchoate drawstring of definite, predetermined length (Fig. 34), the string feeding freely through the threader tube. After this the clamping rod 156 moves forward to clamp the pulled string at a second point against abutment 151, as shown in Fig. 35. The cutter blade 182 is then operated to sever the pulled out string portion from the supply string. The cutter blade begins to move backward and the clamping rods 155, 156 are both moved backward to their normal positions. Then the needles 129, 130 begin their forward traverse between the abutments 150 and 151 and toward the abutments 150', 151' to thread the first drawstring D through the bag hems, the ends of the string being carried through to the opposite side of the bag and knotted by the knotter at the right hand side of the drawstring threading zone, as hereinafter described. The needles enter the hem at the near side of the bag through the openings formed by the piercers 128, which are spread apart as they enter to bulge the hem, as previously described. As the needles travel through the hems in contact with the outer side walls of the latter the lengths of the drawstring portions enter and lie within the longitudinal grooves of the needles, thus allowing the string to be threaded with a minimum degree of resistance. (See Fig. 36.) After the first drawstring is thus inserted, and upon the passage of the forward end of the needles between and beyond the abutments 150', 151' at the far side of the drawstring threading zone, and while the ends of the said first drawstring are being knotted, the threader 159' at that side of the zone comes into action and threads a string from a second supply source to the rear eyes 146 of the needles, and the clamping rods, puller, cutter and associated parts at that side of the zone are operated while the needles are temporarily at rest to form a drawstring portion to be passed through the hems on the return travel of the needles to form the resulting second drawstring D' shown in Figs. 38 and 39, the ends of which are knotted by the knotter at the near side of the drawstring threading zone. The needles then return to their normal starting position in readiness for a repetition of the operations above set forth to thread drawstrings through a succeeding bag.

*Drawstring end lifting and clamping device*

The drawstring end lifting and clamping device 162 located at each side of the drawstring threading zone comprises a tubular member 192 (Figs. 8, 10, 11, 12, 13, 15, 36, 37 and 39) which extends upward through the block 147 (147') in rear of the abutments 150, 151 (150', 151') to a point elevated above the needle path, and in this tubular member is slidably mounted a lifting rod or plunger 193, adapted to engage and lift the ends of a drawstring so as to bring the same between a head 194 and a spring clamping member 195 at the upper end of the tubular member. The tubular member 192 is formed at its inner side with an opening 196 for passage of the needles and its outer side is open or slotted longitudinally, as at 197, so that the string ends carried by the needles may be engaged by the lifting rod 193 on their release from the needle eyes and forced by the lifting rod up the channeled guideway formed by the slotted side of the tube into clamped engagement between the head 194 and the clamping member 195 in position to be engaged and knotted by the coacting rotary knotter 163 (163').

*Knotters*

The knotters 163, 163' may be of any approved type and their shafts are mounted in suitable bearings 197' and provided with gears 198. Levers 199 (Figs. 2 and 3) coupled by links 200 to the rods or plungers 193 and provided with rollers engaging grooves in operating cams 80 are employed to actuate said rods or plungers 193. Racks or their equivalent 201 (Figs. 10 and 11) meshing with the gears 198 and coupled to rods 202 connected to levers 203 having rollers engaging grooves in the operating cams 90, are employed to actuate the knotters 163, 163'. The knotters form knots d, d' of suitable form to unite the extremities of the free projecting ends of the drawstrings D, D'.

The knotters 163, 163' may be of the type shown in my aforesaid patent, or as shown in patents to Coleman, Nos. 672,635 and 672,636, dated Apr. 23, 1901; patent to Coleman, No. 755,110, dated Mar. 22, 1904; patent to Peterson, No. 959,592, dated May 31, 1910; patent to Coleman No. 1,029,853, dated June 13, 1912; and patent to Coleman, No. 1,072,575, dated Sept. 9, 1913.

*Bag conveyor or stacker grippers*

Figure 3:
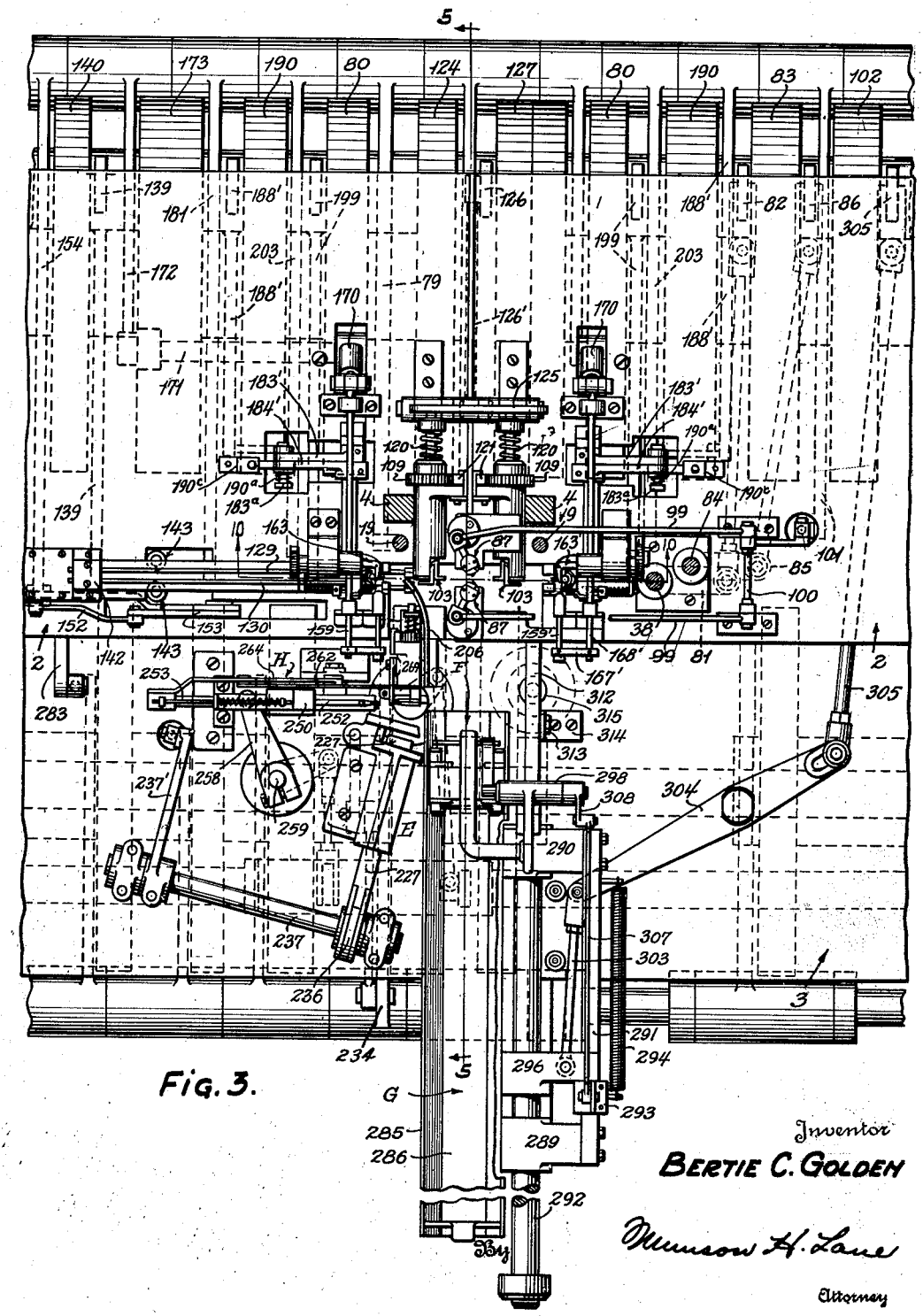
Fig. 3 is a horizontal sectional view taken substantially on the line 3—3 of Fig. 1.

While the bag to which the drawstrings have thus been applied is still held by the reversing grippers 103, as shown in Fig. 40, bag conveyor transfer or stacker grippers 205 come into action to engage and support the bag. These grippers 205 are provided to convey the bag first to a tagging mechanism E (Fig. 21) and thence to stacking mechanism F (Fig. 3), by which the bag is delivered to a collection hopper G (Figs. 49 and 50). The grippers 205 are operated to engage the bag and to come in full engagement therewith at the moment the bag is released by the reversing grippers but while the looped ends of the strings are still engaged by the knotters and held lifted and extended by the lifting and clamping devices 162, so that upon movement of the grippers 205 toward the hopper G the drawstrings will be pulled taut. On this movement of the grippers 205 the looped end of one of the drawstrings, as the drawstring D', will be moved into engagement with a slotted or forked drawstring guide 206 (Fig. 40). Guide 206 is carried by the machine frame, as shown in Figs. 3 and 7. Simultaneously the clamping rods of the devices 162 will be retracted to release the ends of the drawstrings and the ends of the strings will be withdrawn from engagement with the knotters.

It will be noted that the fixed slotted drawstring guide 206 is arranged at one side of and in generally parallel relation to the path of movement of the grippers 205 to and fro between the stringing station where the bag has been supported by the corner grippers 103 during the stringing and knotting operation and the tagging and stacking stations E and F respectively, and that the slot in the drawstring guide extends lengthwise thereof and terminates in an enlarged opening permitting the knot to be drawn laterally from the guide by the tagging mechanism. The slotted guide member receives the drawstring which is located at the side of the bag which is to be tagged just as the drawstring is about to be released by the knotter and associated gripping mechanism and retains the drawstring in laterally extended position, as indicated in Figs. 40, 41 and 42, until the drawstring is in a position to be acted upon by the tagging mechanism at the station E, as will be more fully described hereinafter. Thus, the drawstring to which the tag is to be applied is at all times laterally supported by the slotted guide member 206 from the time it is released by the knotter and knotter gripping mechanism associated therewith until the tagging mechanism comes into play, at which time the enlarged opening at the end of the slot in the drawstring guide permits the knotted end of the drawstring to be drawn out of the slot during the tagging operation.

The grippers 205 comprise a pair of parallel rods or shafts 207 and 208 journaled in a carriage or frame 209 (Figs. 46, 49 and 50) and carrying at their forward ends right angularly arranged gripping fingers 210 having straight or flat engaging faces 211 to bear against the inner sides of the upper corners of the bag. The fingers are adapted to be rotated downward and outward to bag gripping positions and to be reversely rotated upward and inward to bag releasing positions. At their rear ends the shafts 207 and 208 are provided with eccentric heads 212 and 212' coupled by a link 213 for simultaneous motion, and to one of the eccentric heads is coupled a connecting rod 214 by which the shafts may be operated through means cooperating with parts of the bag stacking mechanism F, as hereinafter described.

The preferred tagging mechanism E is best shown in Figs. 9, 21, 22 and 43 to 47 inclusive. On a support or bracket 215 a vertical guideway 216 is provided for a tag strip feeder 217 which may be a finger fixed to a horizontal rod 218 which is slidable up and down in vertically extending guide slots provided in guide plates 219, the latter being fixed to the guideway 216 on opposite sides thereof. Said finger is provided with a tooth or projection 220 adapted to engage eye openings or perforations 221 in a tag stock strip 22, the major part of which is wound or rolled up on a supply reel 223 (Figs. 1 and 5). As will be described, the tag strip is adapted to be cut or punched for each tagging operation to form a tag with an eye or perforation, and is fed a distance each time equal to the distance between adjacent eye openings by engagement of the feed tooth 220 with an eye opening, while the finger is oscillated sufficiently to adapt it to move into and out of engagement with an eye opening for strip feeding and releasing actions. A tiltable, gravity operating presser foot or detent 224 is provided above the feeder to engage with one of the eye openings to hold the strip stationary while the feeder is moving upward for a strip engaging action and ensuing downward feed action.

Figure 4:
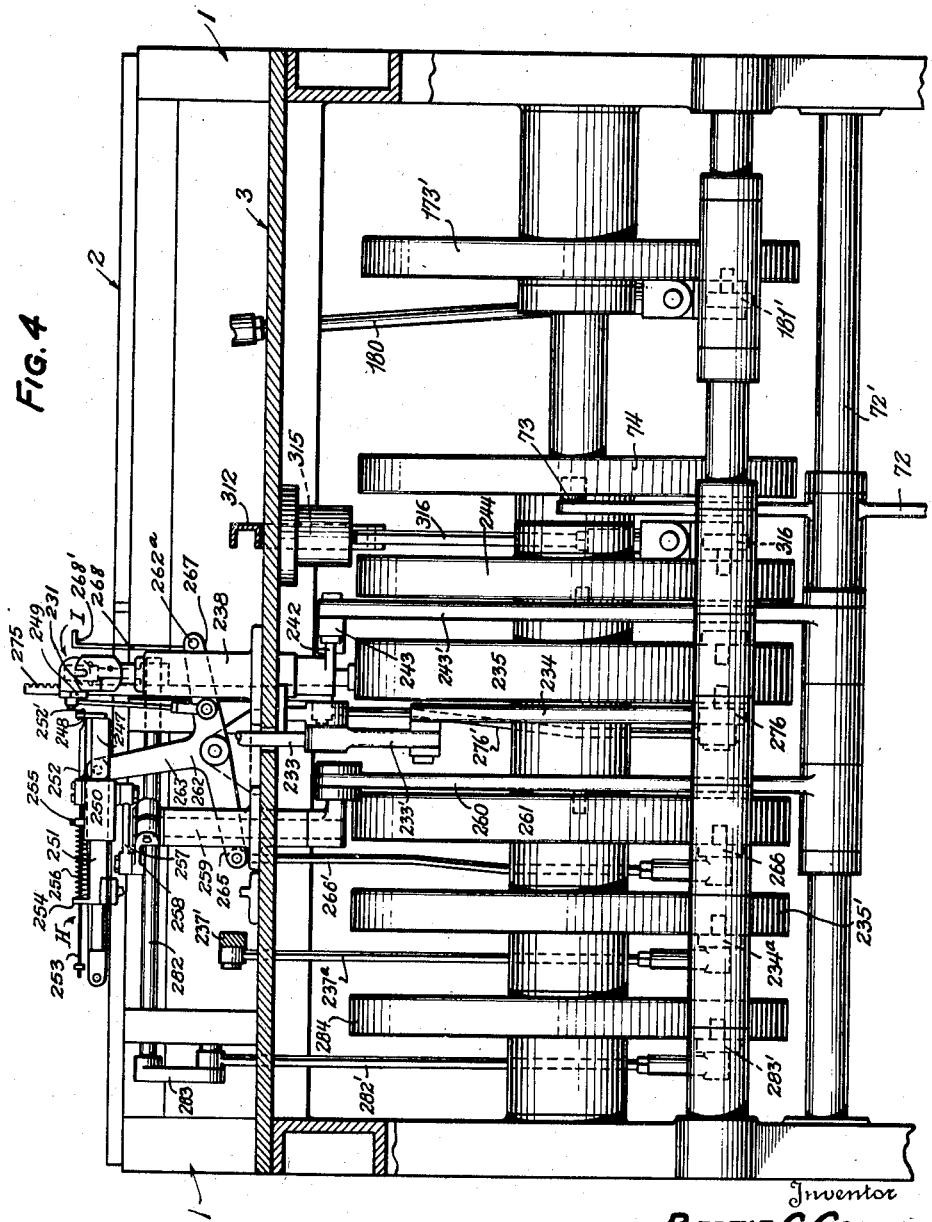
Fig. 4 is a vertical sectional view taken substantially on the line 4—4 of Fig. 1 with the parts shown in Fig. 2 omitted for the sake of clarity.

Arranged at the base of the guideway 216 is a two-part die comprising (1) a hollow die head 225 having a strip inlet or feed passage 226 and (2) a die plunger 227 movable through the head. The coacting surfaces of these die members are shaped to cut from the strip a tag 228 of the form shown in Fig. 43 or other suitable form, said tag having an eye 221 formed by an opening in the portion of the strip from which it is stamped. Each time the feeder 217 moves upward to engage the strip and then downward to normal position it feeds the lower end portion of the strip through the passage 226 into the die head 225, and the plunger die 227 on its forward movements cuts off this portion of the strip to form a tag. The plunger die 227 has a suction passage 229, opening through its free end and communicating with a suction producing source 230, for creating sufficient suction to hold the formed tag thereon while it is being delivered by a continued forward movement of the plunger to a tag holder or suction head 231. The means for operating the strip feeder 217 comprises an arm 232 fixed to the rod 218 and to a vertically sliding rod 233 coupled by bell cranks 233' to a lever 234 (Figs. 1 and 6) having a roller engaging a groove in an operating cam 235 (Fig. 4). The means for operating the plunger die 227 comprises a crank arm 236 (Fig. 3) to which the plunger die 227 is linked and which crank arm is fixed to a shaft 237 having an arm 237' connected by a rod 237ª (Fig. 4) to a lever 234ª engaging a groove in an operating cam 235'.

The suction head 231 is normally arranged to lie in a tag receiving and tag looping position in which it faces the die plunger, as shown in Figs. 43 and 45, and at right angles to a string threading position, as shown in Figs. 44 and 46, in which it faces a needle mechanism H for the threading of the looped end of the drawstring D' through its eye. It is rotatably mounted in a support 238 to adapt it to be turned to these working positions. The suction head 231 has a flat face 239 against which the tag fed thereto by the plunger die is adapted to be held by suction through the medium of a plurality of openings 240 (Fig. 21) communicating through a suitable passage with a suction source 241. Oscillatory motion is imparted to the suction head through the medium of a crank arm 242 (Fig. 4) coupled to a rod 243 connected to a lever 243' having a roller engaging a groove in an operating cam 244. Formed in the upper edge of the suction head 231 is a needle guide slot or passage 245 (Figs. 45–47) with which the eye of the tag registers when the tag is applied to the face 239, and formed in one of the sides of the head is a recess 246 which intersects the face 239.

Rotation of the head 231 bearing the tag 228 from the position shown in Fig. 43 to that shown in Fig. 44 disposes the head for coaction with the tagger needle mechanism H and a tag clamping device 247 having a presser foot 248, and also for cooperation with a tag looping or knotting device I and a retaining hook 249 thereon.

*Needle mechanism for tagger*

The needle mechanism H comprises a reciprocatory carriage 250 (Figs. 4 and 7) slidably mounted on a bar 251. To the carriage is fixed a hollow needle 252 having a hook 252' at its forward end (Figs. 43 and 44) and in this needle is slidably fitted the forward portion of a latch rod 253, adapted to close the hook against the displacement of the drawstring end therefrom. The rear portion of the latch rod is slidable through a guide 254 on the bar 251 and disposed about the latch rod between the guide 254 and an abutment 255 on the latch rod is a coiled spring 256. The spring is tensioned when the bar 251 is moved forward to transmit forward movement of the rod to latching position and serves by reaction to retract the rod when the bar 251 is moved in the opposite direction or retracted. The bar 251 is bored to slidably receive the tag clamping device 247 which comprises a rod or bar extending through the bar 251 and carrying at its forward end the presser foot 248. The carriage 250 is adapted to be intermittently reciprocated through the medium of a link 257 (Fig. 4) coupling it to a crank 258 on a rock shaft 259 coupled to a lever 260 carrying a roller engaging a groove in an operating cam 261. The bar 247 is adapted to be intermittently reciprocated through the medium of a T-shaped lever 262 fulcrumed on the plate 3. One arm 263 of this lever 262 is coupled by an arm 264 (Fig. 9) to the rear end of the bar 247. Another arm 265 of the lever 262 is coupled by a link 266' (Fig. 4) to a lever 266 having a roller engaging a groove in the operating cam 261, whereby said lever is operated. The third arm 267 of the lever 262 is connected at 262ᵃ (see also Fig. 9) to a vertically movable drawstring end supporting member 268 having a laterally bent upper end or shelf 268' on which the drawstring end D' is designed to rest and provided with a slot 268ᵇ (Fig. 1) engaging a guide pin or bolt 268ᶜ on a fixed part of the machine whereby the member 268 is guided in its up and down movements.

The tag looper I (Figs. 7 and 9) comprises a housing sleeve 269 mounted on the suction head support 238 and in which are concentrically journaled a rotatable sleeve 270 (Figs. 43-47) and a shaft 271 splined to the sleeve 270 to rotate therewith and to slide therein. The sleeve 270 and shaft 271 project at their front ends beyond the sleeve 269 and carry hooked gripping jaws 272 and 273 which are rotatable in unison and also movable toward and from each other for gripping actions. The sleeve 270 is formed at its rear end with a gear 274 in mesh with a rack 275 whereby rotary motion is imparted thereto. The rack in turn is connected by a rod 276' (Fig. 4) with a lever 276 having a roller engaging a groove in the cam 235 whereby it is operated to periodically rotate the sleeve 270 and shaft 271. The rear end of the shaft 271 projects beyond the sleeve 269 and the gear 274 and has arranged thereon a spring 278 (Fig. 43) disposed between the rear end of the sleeve 270 and a head or enlargement 279 on the shaft by means of which the shaft is adapted to be moved rearwardly to open the jaws 272 and 273. A tappet lever 280 (Figs. 7 and 9) is arranged to bear on the head 279 and is fixed to a shaft 282 (Fig. 4) extending across the machine and carrying an arm 283 connected to a rod 282' coupled to a lever 283' having a roller engaging a groove in an operating cam 284 whereby the tappet 280 is periodically rocked to allow opening of the jaws 272 and 273 while the spring 278 normally holds them closed.

Fig. 43 shows the parts of the tagging mechanism as they appear just after the transfer of a formed tag 228 to the suction head 231 by the die plunger 227 and before the suction head has been turned to face the needle mechanism. In this view the needle 252 and presser head 248 are shown in normal position. Fig. 44 shows the suction head turned to face the needle mechanism, the tagger needle 252 projected through the guide slot 245 in the suction head and between the strands of the ends of the drawstring D' and resting on the shelf 268' of the supporting member 268, the presser foot 248 moved forward to hold the tag firmly against the suction head and the retaining hook 249 brought by the movement of the suction head adjacent the recess 246 in the suction head. In this position of the parts one of the strands of the drawstring is engaged by and lies in the hook of the needle and is held therein by the latch rod 253 which has moved to latching position. The support 268, which has been moved up to supporting position, holds the drawstring end D' supported while the needle is being introduced between its strands. Fig. 45 shows the tagger needle 252 moved rearwardly to draw the drawstring end through the guide slot 245 in the suction head and eye of the tag, and the bight of the loop of the drawstring brought into engagement with the retaining hook 249, the presser foot 248 remaining in clamping position. The presser foot, however, is about to move out of engagement with the tag and the retaining hook 249 serves at this time to hold the strands of the drawstring open or spread as the needle 252 continues its backward movement to allow the hooked jaws 272 and 273 of the looping device to enter between the strands on the movement of the parts to the positions shown in Fig. 46 which shows the next stage of operation in which the presser foot 248 has been retracted, the suction head rotated back to normal position and the looper rotated through about one-half of its orbit, during which its hooked jaws have been passed down between the strands of the drawstring and caused to close and grip the tag between them, the drawstring hook being held in drawn out position by the needle to which it is still clamped. Fig. 47 shows the position of the parts as they near the final tagging stage, in which position the looper has lifted the tag between the strands of the looped end of the drawstring while the hook 252 still holds the loop taut, thereby securely fastening the tag 228 to the drawstring. After the tag has been drawn completely through the loop and the tag is secured to the drawstring the end of the drawstring is released by the hook 252 and the tag is released by the looper, the jaws of which separate at the proper moment to release the tag. Fig. 48 illustrates the bag with the tag applied and the confining loop or knot $d^2$ formed in the string.

During the formation and application of the tag the bag is held in a stationary position by the stacker grippers 205, but upon conclusion of the tag applying operation the said grippers are released at a proper time period to allow transfer of the bag by bag stacking means F to the collection hopper G.

The tagging mechanism E, the stacking means F, including the hopper G, and the transfer grippers 205 are mounted on the depressed platform or table portion 3 (Figs. 1, 3, 5 and 7) in proper position for cooperation with the reversing plunger 53 and reversing corner grippers 103 so that the bags as reversed will be successively delivered from said grippers and conveyed to the tagging mechanism for the application of tags to the bags and the delivery of the tagged bags to the collection hopper G in which they are stacked. The hopper G (Figs. 49 and 50) comprises an open-topped trough-like receptacle 285 provided with a narrow, flat bottom 286 and side walls 287 which converge in the direction of the bottom. The hopper is supported by bracket means 288 to which it is fastened and which is fastened to the plate or table 3. Fixed to blocks 289 and 290 forming part of the bracket and extending along one side of the hopper is a guide bar 291, and slidably mounted in said blocks in parallel relation to the bar is a rod 292. On the guide bar 291 is slidably mounted a collar or sleeve 293 with which is connected the rear end of a coiled spring 294 which is connected at its forward end to the forward portion of the bar 291, as indicated at 295. Fixed to the slidable rod 292 is an arm 296 which projects laterally therefrom and has its free end arranged to lie in the path of forward travel of the sleeve 293. Projecting upward from the block 290 is a bearing and supporting bracket 297 carrying a bearing sleeve 298 in which is journaled a shaft 299 which extends therethrough.

Fixed to the bracket 297 is an angular arm 297' which extends longitudinally of and above the hopper and operates as a stop to prevent upward displacement of the stacked bags and to guide them rearwardly as successive bags are fed into the hopper. To the inner end of the shaft 299 is fastened a bag pusher 300 forming, with said shaft, the hopper and associated working parts the stacking means F. The pusher 300 extends forwardly from shaft 299 to a point about in line with the forward end of the hopper and has a depending blade or plate portion 301 normally arranged at or adjacent to such end of the hopper. This pusher is provided for advancing the supply of bags in the hopper as the successive bags are collected from the bag lifting or delivery grippers 205. Normally the pusher blade or plate 301 is disposed to engage the last bag delivered to the stack and to push the stack of bags along the hopper as successive bags are delivered thereto. In this position also the bag pusher blade or plate lies just in front of the grippers 205, when the latter are in their rearward or retracted position, so as to engage the bag last delivered and released by the grippers and press said bag against the other bags of the stack. The pusher is shown in this normal position in Figs. 1 and 3, which also show the gripper carriage and grippers 205 in retracted position, while Figs. 49 and 50 show the gripper carriage and grippers in advanced position and the gripping fingers arranged to take a bag from the reversing grippers. The pusher 300 is adapted to be swung upward from such normal position shown in Figs. 1 and 3 to an elevated position sufficient to allow the grippers to be moved forward for a bag engaging action and for subsequent backward travel for delivery of the bag to the hopper. The rod 292 supports the grippers 205, to the forward end of which the gripper frame or carriage 209 is fastened by means of a bracket 302 secured to the rod by suitable fastening means 302'.

The means for operating the pusher 300 and the grippers 205 comprises a connecting rod 303 (Fig. 3) coupling the arm 296 to one end of a lever 304, which lever is coupled at its opposite end to a rod 305 having a roller (Fig. 2a) engaging a groove in an operating cam 102, whereby the rod 292 is periodically reciprocated. Movement of the lever 304 in the direction to shift the arm 296 and rod 292 rearwardly effects rearward travel of the gripper mechanism 205 to normal or bag delivery position, and in this movement of rod 292 the arm 296 acts to slide the sleeve 293 rearwardly on bar 291 and to tension the spring 294. To the sleeve 293 is coupled a rod 307 which connects the sleeve with a crank arm 308 on the outer end of the shaft 299 which operates when the sleeve 293 is moved rearwardly to swing the pusher 300 and pusher blade 301 from a raised position downwardly and rearwardly to normal bag delivery and retaining position. On the forward movement of the rod 292, carrying with it the arm 296, and whereby the gripper mechanism 205 is moved forwardly to bring the grippers in position to engage a reversed bag held by the reversing grippers 103, as shown in Fig. 49, sleeve 293 is permitted to be drawn forwardly by the contraction of the spring 294 to swing the arm 308 in the opposite direction and raise the pusher 300 and pusher blade 301 out of the path of travel of the grippers 205. The bracket 302 has a downward extension 309 (Figs. 1 and 50) to which is pivoted a toggle lever 310, one arm or lever member of which is connected to the rod or link 214 which is coupled to the shafts of the grippers 205, whereby when the rod 214 is moved downwardly the shafts 207, 208 of the grippers 205 will be rotated in one direction to turn the gripper fingers 205 down to bag gripping position, and whereby when the rod 214 is moved upwardly shafts 207, 208 will be rotated in the opposite direction to swing the fingers 205 upward to releasing position. The other arm or lever member of the toggle lever 310 carries a roller 311 which is fitted to travel and pivot in the channel of a channeled guide member or rocker bar 312 connected adjacent one end thereof by a pin or bolt 313 with a slotted bracket 314 fixed to the table 3 whereby it is adapted to rock or tilt in a vertical plane to allow said arm or lever to be moved up and down under the action of a plunger rod 315. This rod 315 is coupled to a lever 316 having a roller engaging a groove in the operating cam 244 (Fig. 4) whereby the rod is actuated at proper time periods to raise and lower the rocker bar 312 and thereby project and retract the gripping fingers at the ends of the reciprocating strokes of the gripper frame or carriage, during which the roller 311 travels in the guide channel of the channeled guide member or rocker bar.

As previously described, the grippers 205 are moved forward while the bag is being reversed and brought to a position to engage the reversed bag while the reversing corner grippers 103 are still engaged therewith, as shown in Fig. 40. The grippers 205 are then rotated to engage the bag, as shown in Fig. 41, while the reversing grippers are moving out of gripping position, as shown in Figs. 41 and 42, so that they will be fully engaged with the bag during such movements of the reversing grippers and before the reversing grippers release their hold on the bag, as shown in Fig. 42. The grippers 205 are then moved rearwardly sufficiently to convey the bag to the tagging mechanism, where, due to the action of cams 306 and 244, they remain at rest to properly support the bag while the tag is being applied, after which the backward movement of the grippers 205 is resumed to convey the bag to the collection hopper. Just prior to the forward movement of the grippers 205, the pusher 300 is moved upward and the pusher remains in this position until, through the rearward movement of the grippers 205, the tagged bag is conveyed thereby to the entrance end of the collection hopper, at which time the grippers 205 are released and the pusher is actuated to push the released bag against the previously delivered bag of the stock in the collecting hopper. These movements of the parts 205 and 300 are properly timed with regard to each other, to the action of the reversing grippers 103 and to the action of the tagging mechanism through the operation of their operating cams.

Figs. 1 and 3 show the normal position of the pusher 300, grippers 205 and their working parts, with the gripper carriage retracted and the pusher blade 301 turned downward. Spring 294 at this time is fully tensioned. When the rod 292 moves forward spring 294 is allowed to contract and operate the pusher to swing it upward out of the path of the grippers 205. Continued movement of the rod 292 brings the grippers 205 to gripping position, as shown in Fig. 50, and the rocker bar 312 will be actuated to rotate the grippers 205 to bring the gripper fingers into engagement with the mouth of the bag as the reversing grippers start to release the bag. The rod 292 then begins its backward movement to bring the bag to tagging position, during which their respective actuating cams keep said rod and the gripper mechanism 205 stationary. Upon the application of the tag the rearward movement of the rod 292 and gripper mechanism 205 is resumed until they are fully retracted, at which time the rocker bar 312 is actuated to rotate the grippers 205 to bag releasing position. During the retraction of the rod 292 and grippers 205 the spring 294 is gradually tensioned and arm 308 moved when the spring is nearly fully tensioned to swing the pusher 300 and pusher blade 301 downward back to normal position to cause it to engage the bag as released by the grippers 205 and force the bag into the stacking hopper G.

The operating cams employed in this machine may be generally similar in construction and principle to those shown in my aforesaid prior Patent No. 2,296,783, and suitably formed for their operating actions, or any other suitable mechanism for operating the various parts may be used.

Fig. 40 illustrates the reversing grippers 103 still in bag gripping positions, the plunger gripper 53 having been released at the proper movement so that the reversing grippers 103 and thereafter the transfer grippers 205 will retain a firm hold on the bag, the only resisting forces consisting in the withdrawal of the drawstrings from their respective knotters.

As will be noted from Figs. 27-29, the jaws of the plunger gripper 53 are considerably narrower than the normal width of the bag. This is also true of the tongue 52 of the tongue plate 51 which forms the tuck in the bottom of the bag which is gripped by the jaws of the plunger gripper 53. Accordingly the bag when reversed will take the contour of Fig. 30, with the sides of the bag converging from full bag width at the mouth to a narrower width at the bottom slightly less than the width of the plunger gripper jaws. This leaves the side margins of the bag tucked in, which facilitates effective filling of the bag to the end that the bottom area may take a flat contour and without projecting ears at the corners of the bag. At the same time the contour of the bag is such that its taper conforms to the angular relation of the side walls of the collection hopper G (Fig. 50). The narrow bottom ends of the bags will rest on the bottom 286 of the hopper and the converging side edges of the bags will conform to the converging side walls 287 of the hopper. The bags will therefore stack substantially vertically in the hopper and the bags accumulated in the hopper will be pushed rearwardly as succeeding bags are delivered thereto. When the bags are so stacked the drawstrings will lie wholly outside their respective bags and hang over the edges of the hopper side walls. The bags will thus be arranged in a compact and orderly manner in the hopper and all bags will be of flat formation in the plane of their respective side seams. By the action of the reversing grippers 103 and the transfer grippers 205 the bag mouth will be held open under internal pressure at the ends of the mouth while fully reversed, so that there will be no tucked in corner portions left to interfere with the free filling of the bag or to cause deformation of the mouth of the bag when filled.

From the foregoing description, taken in connection with the drawings, the construction and mode of operation of the machine and its various parts will be readily understood without a further and extended description. It will be observed that the construction of the machine is such as to adapt the bag chain to be moved horizontally to the feed carriage, then vertically downward while the bags are being reversed, and then horizontally to stacking or tagging and stacking means. By such construction and arrangement the overall dimensions of the machine may be decreased so as to secure compactness and provide a machine which occupies a small amount of floor space. The construction of the bag piercing nickers and piercing needles employed is also such as to prevent tearing or the formation of unduly large openings in the bags so that substantial advantages in this respect are obtained. The invention also provides a drawstring threading needle mechanism which will operate with great rapidity, reliability and efficiency. The invention further provides a stacking mechanism which insures the smooth and certain stacking of the stringed bags in an orderly manner and a tagging mechanism whereby tags may be formed and applied to the bags in their course of travel from the reversing means to the stacking hopper. The construction of the machine is furthermore such as to secure general simplicity and efficiency and to provide a machine having a large output and which may be manufactured, sold and maintained in repair at a comparatively low cost.

While the construction herein disclosed for purposes of exemplification is preferred, it is to be understood that I do not limit my invention thereto, as changes in the form, construction and arrangement of the parts, falling within the scope of the appended claims, may be made without departing from the spirit or sacrificing any of the advantages of the invention.

I claim:

1. A bag stringing machine comprising draw string needles having an eye, first and second string clamping abutments arranged at opposite ends of the path of travel of the needle and at opposite sides thereof, reversing grippers and a plunger gripper cooperating therewith for reversing successive bags, said reversing grippers supporting the bags in a needle threading position, first and second string clamps arranged externally of the needles and coacting with their respective abutments for clamping portions of the first and second draw strings, means for successively actuating said string clamps at each end of the needle traverse, and needle actuating means for projecting the needles through the bag supported by said reversing grippers and bringing the needles to first and second string threading positions.

2. A bag stringing machine comprising vertical guide means for a chain of bags, means for guiding the chain of bags to the upper portion of the vertical guide means, draw string threading needle means, reversing gripper means and bag reversing means coacting with said gripper means for reversing successive bags, said gripper means supporting the successive bags in a draw string threading position with respect to said needle means, a carriage movable upwardly and downwardly on the vertical guide means and having gripper means for connection with the foremost bag in the chain at the limit of upward movement of the carriage to advance the bag on the downward movement of the carriage to said reversing gripper means and said bag reversing means, a cutter means carried by said carriage, and means for actuating said cutter means for severing the foremost bag from the chain.

3. A bag stringing machine comprising vertical guide means for a chain of bags, means for guiding the chain of bags to the upper portion of the vertical guide means, draw string threading needle means at the lower end of the vertical guide means, reversing gripper means and bag reversing means coacting with said gripper means for reversing successive bags, said gripper means supporting the successive bags in a draw string threading position with respect to said needle means, a carriage movable upwardly and downwardly on the vertical guide means and having gripper means for connection at the limit of upward movement of the carriage with the foremost bag in the chain to advance the bag on the downward movement of the carriage to said reversing gripper means and said bag reversing means, and for severing successive foremost bags from the chain.

4. A bag stringing machine comprising supply means for a chain of bags, draw string threading needles having front and rear eyes, reversing gripper means and bag reversing means coacting with said gripper means for reversing successive bags, said gripper means supporting the successive bags in a draw string threading position with respect to said needle means, a carriage having gripper means for connection with the foremost bag in the chain to advance the bag to said reversing gripper means and said bag reversing means, a cutter means carried by said carriage, means for actuating said cutter means for severing the foremost bag from the chain, needle threader means for threading the front and rear eyes of said draw string threading needles with a first draw string and a second draw string supply, puller means coacting with said draw string threading needles for pulling the draw strings for length, cutters for severing the draw strings from the sources of draw string supply, means independent of the needles for clamping the supply strings during the pulling and severing actions, respectively, and knotters for tying the respective draw strings after threading of the latter through the successive bags by said draw string threading needle means.

5. A bag stringing machine comprising supply means for bags having continuous side seam threads connecting the bags in chain formation, said side seam threads being located on the bags to provide flaps along the side margins of the bags, draw string threading needles each having a front eye and a rear eye, reversing grippers and bag reversing means coacting with said reversing grippers for reversing successive bags, said grippers coacting with said flaps and arranged for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said cutter means being located a predetermined distance from said carriage grippers to sever the side seam threads a predetermined distance from the bottom of the bag being severed from the chain, positioning means associated with said carriage grippers for prelocating the foremost bag in the chain before being gripped by said carriage grippers, needle threader means for successively threading the front and rear eyes of the needles from sources of draw string supply, puller means coacting with said draw string threading needles for pulling the draw strings for length, cutters for severing the draw strings from the draw string supply sources, and knotters for tying the respective draw strings after threading of the latter through the bag by said draw string threading needles.

6. A bag stringing machine including draw string threading needles, each having a front eye and a rear eye, needle threader means for successively threading the front and rear eyes of the needles from sources of draw string supply, puller means coacting with said draw string threading needles for pulling the draw strings for length, cutters for severing the draw strings from the sources of draw string supply, and knotters for tying the respective draw strings after threading of the latter through the bag by said draw string threading needles.

7. In a bag stringing machine for bags having hems at their mouth ends, a pair of needles for threading two draw strings in opposite directions through the hems, each needle having a front eye and a rear eye, means for successively threading the front and rear eyes of the needles from string supply sources and forming draw strings therefrom, means for actuating the needles to thread the draw strings through the bag hems, bag reversing means supporting successive bags after reversal thereof in a draw string threaded position with respect to the needle means, and means for feeding bags to said bag reversing means.

8. In a bag stringing machine, needle means for threading a bag, a clamping abutment, means for threading the needle means from a supply string, a clamping member mounted independent of the needle means for clamping the string at one end of a draw string portion to be formed against the clamping abutment, means for pulling out the supply string to form a draw string portion, a second clamping abutment, a clamping member mounted independent of the needle means for clamping the supply string at the other end of the draw string portion against the second clamping abutment, means for severing the draw string portion from the supply string, and means for operating the needle means.

9. In a bag stringing machine, needle means for threading a bag, a clamping abutment, means for threading the needle means from a supply string, a clamping member mounted independent of the needle means for clamping the string at one end of a draw string portion to be formed against the clamping abutment, means for pulling out the supply string to form a draw spring portion, a second clamping member mounted independent of the needle means for clamping the supply string at the other end of the draw string portion, means for severing the draw string portion from the supply string, means for operating the needles, and a knotter for knotting the end of the draw string.

10. In a bag stringing machine, needle means for threading a bag, a clamping abutment, means for threading the needle means from a supply string, a clamping member mounted independent of the needle means for clamping the string at one end of a draw string portion to be formed against the clamping abutment, means for pulling out the supply string to form a draw string portion, a second clamping member mounted independent of the needle means for clamping the supply string at the other end of the draw string portion, means for severing the draw string portion from the supply string, means for operating the needles, a gripper to grip the end of the draw string, and a knotter to knot the gripped end of the string.

11. In a bag stringing machine, a pair of spaced abutments, a pair of parallel needles movable between the abutments, means for threading the needles from a source of supply of a supply string, a clamping member disposed at one side of the needles for clamping the string against one of the abutments, means for pulling out the string to form a draw string portion, a second clamping member disposed at the opposite side of the needles for clamping the string against the other abutment, and means for operating the needles.

12. A bag draw stringing machine including a pair of spaced abutments arranged side by side, a pair of stringing needles movable through the space between the abutments and each having an eye, means for passing a supply thread through the eyes of the needles, means for clamping the thread at one end of a draw string portion to be formed against one of the abutments and leaving the remainder of the thread free to be drawn out, means for drawing out the thread to form a measured draw string portion, means for clamping the thread at the other end of the draw string portion against the other abutment, means for severing the second named end of the draw string portion from the supply thread, and means for operating the needles to thread the so formed draw string through the bag and for operating the other parts in timed accord therewith.

13. In a bag stringing machine, supporting means for holding a bag in position, a pair of abutments at each side of the supported bag, a pair of reciprocatory needles movable across the space between the pairs of abutments and through the bag to thread a first draw string therethrough in one of their directions of movement and to thread a second draw string therethrough in their reverse direction of movement, each of said needles having a front eye and a rear eye, devices adjacent the respective pairs of abutments to respectively thread the front and rear eyes of the needles with string from supply strings, devices for cooperating with each pair of abutments for clamping the string first against one abutment and then against the other abutment of the pair, a device cooperating with each pair of abutments to pull out the string between said clamping periods to form a draw string portion, means for severing the draw string portions, and means for reciprocating the needles.

14. A machine for stringing wrong side out bags having hems at their mouth ends, comprising threading means for threading draw strings through the hems, bag reversing means supporting successive bags after reversal thereof in draw string threading position, means for feeding bags to said bag reversing means, the bag reversing means including a member movable into and out of a bag through its mouth and engageable with the bottom of the bag to draw it outwardly and reverse the bag while held by the feeding means, and resilient bag mouth opening means engageable with said hems to spread the latter to facilitate reversal of the bag, said means being yieldable to compensate for variations in the thickness of the mouth end as the latter is turned outwardly and the bag reversed.

15. A machine for stringing wrong side out bags having hems at their mouth ends, comprising bag reversing and supporting means, feeding means for supplying bags successively to said reversing means and gripping the hems of each bag at spaced points transversely of the bag, means movable through the hems for inserting draw strings in the hems of said bags after reversal and while supported by said bag reversing means, the bag reversing means including a member movable into and out of a bag through its mouth and engageable with the bottom of the bag to draw it outwardly and reverse the bag while held by the feeding means, and bag mouth opening elements for spreading the bag hems, said elements comprising heads movable toward and from the hems, bag piercing members movably mounted on the heads, and resilient means elastically backing the heads to permit outward yielding movement thereof under pressure of the hems as the hems are outturned in reversing the bag.

16. A machine for stringing bags having hems at their mouth ends and received wrong side out and in chain formation from the sewing stage, comprising bag reversing and supporting means, feeding means for gripping the hemmed end of and advancing successive bags to said bag reversing means, means for severing the foremost bag of the chain from the bag following it and while the hemmed end of said foremost bag is held by the feeding means, means movable through the hems for inserting draw strings in the hems of said bags after reversal and while supported by said reversing means, the bag reversing means including a member movable into and out of a bag through its mouth and engageable with the bottom of the bag to draw it outwardly and reverse the bag while held by the feeding means, and bag mouth opening elements for spreading the bag hems apart, said elements each comprising an inwardly and outwardly arcuately swinging support, an inwardly and outwardly sliding head mounted on the support, a piercing pin carried by the head, and a spring carried by the support and yieldingly backing the head.

17. A bag stringing machine for bags having hems at their mouth ends, comprising needles for threading draw strings through the hems, means for actuating the needles, bag reversing means supporting successive bags after reversal thereof in a draw string threading position with respect to the needles, means for gripping and feeding bags to said bag reversing means, the bag reversing means including a member movable into and out of a bag through its mouth and engageable with the bottom of the gag to draw it outwardly and reverse the bag while held by the feeding means, and spring-pressed resilient bag mouth opening means acting on said hems to spread them apart to facilitate reversal of the bag, said hem spreading means being yieldable outwardly under pressure of the hems as the latter are turned out in reversing the bag to compensate for the increased thickness of the mouth of the turned bag.

18. In a bag stringing machine, means for supporting a wrong side out hemmed bag designed to be reversed and while it is being reversed, said means comprising a pair of parallel supports, a set of gripper arms carried by each support, the arms of the sets being angularly related and arranged to engage the hems at opposite sides of the bag mouth and extending convergently toward each other from their supports and having free ends provided with parallel clamping faces to bear on the outer faces of the hems, and fingers on the arms of one set arranged to engage the free longitudinal margins of the hems when the clamping faces are in clamping position.

19. In a bag stringing machine, a vertical guideway, draw string threading needle means, means for advancing successive bags from a position at the upper end of the guideway to string threading position at a lower point in the guideway, reversing grippers at the draw string threading position adapted to support successive bags during the draw string threading operation, and reversing means coacting with the reversing grippers for reversing successive bags, said means for advancing the bags comprising a pair of supports movable upwardly and downwardly along said guideway, feed grippers relatively movable toward and from each other and extending convergently downward from the supports and having at their converging free ends clamping faces engageable with and disengageable from the hems at opposite sides of the mouth of the bag for bag clamping and releasing actions.

20. A stringing machine for bags having hems at their mouth ends embodying a vertical guideway, draw string threading means at the base of the guideway, reversing grippers disposed adjacent to the draw string threading means, bag reversing means coacting with the grippers to reverse successive bags, and sets of feed grippers conjointly movable upwardly to engage the mouth end of a bag at the upper portion of the guideway and conjointly movable downwardly to feed the bag to the reversing grippers and reversing means, said grippers being mounted on supports so as to be relatively movable toward and from each other and toward and from the hems at opposite sides of the bag mouth and extending from their supports downwardly in converging relation and terminating at their lower free ends in parallel vertically disposed gripping faces adapted to grip the hems to move the bag downward.

21. A stringing machine for bags having hems at their mouth sides and side seams providing flaps extending along the side margins of the bags, a vertical guideway, draw string threading means at the lower end of the guideway, reversing grippers disposed adjacent the draw string threading means and having pinching elements for connection with the flaps of successive bags exteriorly thereof, bag reversing means coacting with the grippers to reverse successive bags, said reversing grippers rotating and said pinching elements retaining their grasp on the flaps during and after reversal of the bags, and supporting the bags after reversal during the draw string threading operation, and sets of feed grippers movable upwardly and downwardly along the guideway for delivering successive bags to said reversing grippers, each set of grippers comprising a support and gripping members mounted on the support, the sets of members being relatively movable toward and from each other and extending downwardly from their supports convergently toward each other and having lower free ends provided with gripping faces to engage the hems and advance the bag to the reversing grippers.

22. A bag stringing machine for bags having mouth hems comprising a guide for bags having continuous side seam threads connecting the bags in chain formation, said side seam threads being located on the bags to provide flaps along the side margins of the bags, draw string threading needle means, reversing grippers and bag reversing means coacting with said reversing grippers for reversing successive bags, said grippers being arranged for engagement with said flaps and for supporting the successive bags in a draw string threading position with respect to said needle means, a carriage having grippers for connection with the foremost bag in the chain for advancing the bag to said reversing grippers and reversing means, a cutter means carried by said carriage for severing the side seam threads between the first two bags in the chain, said carriage grippers comprising shafts mounted on the carriage and provided with sets of gripper arms to engage the respective mouth hems and means for rocking at least one of said shafts to move the gripper arms thereof toward and from the gripper arms of the other shaft and into and out of gripping engagement with the hems, said gripper arms being fixed at one end to their shafts and thence converging toward each other and having free ends terminating in gripping faces, said reversing gripper means clamping the bags along outer side margins adjacent the mouths thereof and rotating to retain their grasp on the bag after reversal thereof and during action of the draw string threading needle means.

23. A bag draw stringing machine including in combination a pair of stringing needles, each having an eye, means for passing a supply thread through the eyes of the needles, clamping means arranged externally of the needles for clamping the thread at one end of a draw string portion to be formed and leaving the remainder of the thread free to be drawn out, means for drawing out the thread to form a measured draw string portion, clamping means arranged externally of the needles for clamping the thread at the other end of the measured draw string portion, means for severing the second named end of the draw string portion from the supply thread, and means for operating the needles to thread the so formed draw string through the bag and for operating the other parts in timed accord therewith.

24. A bag draw stringing machine including in combination a pair of stringing needles, each having an eye, means for passing a supply thread from a source of thread supply through the eyes of the needles, stationary abutment means, a reciprocating rod for clamping the thread at one end of a draw string portion to be formed against the abutment means and leaving the other end of the thread free to be drawn out, means for drawing out the thread to form a measured draw string portion, a second reciprocating rod for clamping the thread at the other end of the draw string portion against the abutment means, said rods being arranged externally of the needles, means for severing the second named end of the draw string portion from the supply thread, and means for operating the needles to thread the so formed draw string through the bag and for operating the other parts in timed accord therewith.

25. A bag draw stringing machine including in combination a pair of stringing needles, each having an eye, a reciprocating tubular threader for passing a thread from a source of thread supply through the eyes of the needles, means independent of the needles for clamping the thread at one end of a draw string to be formed and leaving the remainder of the thread free to be drawn out through the threader, means for drawing out the thread to form a measured draw string portion, means independent of the needles for clamping the thread at the other end of the draw string portion, a pivotally mounted cutter for severing the second named end of the draw string portion from the supply thread, and means for operating the needles to thread the so formed draw string through the bag and for operating the other parts in timed accord therewith.

26. A machine for stringing bags having hems at their mouth ends, comprising threading means for threading drawstrings through the hems, means supporting successive bags in drawstring threading position, means for feeding bags to said bag supporting means, and resilient bag mouth opening means engageable with said hems to spread the latter to facilitate reversal of the bag, said means being yieldable to compensate for variations in the thickness of the mouth end as the latter is turned outwardly and the bag reversed.

27. A bag stringing machine comprising drawstring needles, first and second fixed string clamping abutments arranged in pairs adjacent opposite ends of the path of travel of the needles and at opposite sides thereof, means for supporting the bags in a needle threading position, first and second pairs of string clamps arranged externally of the needles and coacting with their respective abutments for clamping portions of the first and second drawstrings, means for successively actuating said string clamps at each end of the needle traverse, and needle actuating means for projecting the needles through the bag supported by said supporting means and bringing the needles to first and second string threading positions.

28. In a bag stringing machine, the combination of a stringing needle having a transverse eye and a longitudinal groove intersecting the eye and opening outwardly through one of the sides of the needle, means for feeding a string through said eye, means for clamping the end of the string which has passed through the eye, means for withdrawing the string feeding means, means for pulling out a length of the string while its end is still clamped, means for clamping the string at a second point, means for severing the string adjacent the second point of clamping, and means for actuating the stringing needle for a stringing action, the string in such action moving laterally and entering the longitudinal groove of the needle.

29. In a bag stringing machine, the combination of a stringing needle having a transverse eye and a longitudinal groove intersecting the eye and opening outwardly through one of the sides of the needle, means consisting of a reciprocatory feed tube adapted to pass through said eye for feeding string to the needle, string clamping means external to the needle, means for operating the string clamping means in timed relation to the needle and the feed tube, and means for actuating the needle for a stringing action, the string in such action moving laterally and entering the longitudinal groove of the needle.

30. A bag stringing machine comprising drawstring needles each having an eye near the forward end thereof, means for supporting a bag in a position to receive the drawstring needles, means for threading a drawstring through an eye of each needle at each end of its traverse, first and second fixed drawstring clamping abutments arranged in pairs adjacent opposite ends of the traverse and on opposite sides of the pair of needles, first and second pairs of drawstring clamps arranged to cooperate with the pairs of clamping abutments to clamp the ends of first and second drawstrings, means for successively actuating said string clamps at each end of the traverse of the needles, means for severing the first and second drawstrings, and means for actuating the needles and the other cooperating parts in timed relation.

31. A bag stringing machine comprising a pair of parallel reciprocating drawstring needles each having a spaced pair of eyes near the forward end thereof, means for supporting a bag in a position to receive the drawstring needles, means for threading a drawstring through the two forwardmost eyes of the needles when on one side of the bag, means for threading a second drawstring through the rear pair of eyes of the needles when thrust through the bag to the opposite side thereof, means for clamping each drawstring at two points on opposite sides of the pair of needles and at each end of the needle traverse, means for severing each drawstring, and means for actuating the needles, drawstring clamps, threading means and severing means in proper timed relation.

32. A bag stringing machine comprising a vertical guide means for a chain of bags, a bag supply station at the upper end of the vertical guide means, a bag stringing station at the lower end of the vertical guide means, bag advancing means comprising a carriage movable upwardly and downwardly between said stations in a rectilinear path parallel to said guide means, bag feeder means carried by said carriage, bag supporting means at said stringing station adapted to receive successive bags from the bag feeding means, and means for at least partially reversing each bag prior to delivery of said bag to the bag supporting means.

33. A bag stringing machine comprising a vertical guide means for a chain of bags, a bag supply station at the upper end of the vertical guide means, a bag stringing station at the lower end of the vertical guide means, bag advancing means comprising a carriage movable upwardly and downwardly between said stations in a rectilinear path parallel to said guide means, bag feeder means carried by said carriage, bag supporting means at said stringing station adapted to receive successive bags from the bag feeding means, and means for at least partially reversing each bag prior to delivery of said bag to the bag supporting means, said supporting means comprising corner grippers adapted to complete the reversing operation.

34. A bag stringing machine comprising guide means for a chain of bags, a bag supply station at one end of the guide and a bag stringing station at the other, bag supporting means at the bag stringing station, bag advancing means comprising a carriage reciprocable between the bag supply and bag stringing stations, said bag advancing means including bag gripper means adapted to deliver successive bags to the bag supporting means, cutting means for severing the threads binding the foremost bag of the chain to the remainder of the chain prior to delivery to the bag supporting means, and means for reversing each foremost bag in part at least prior to its delivery to the bag supporting means at the stringing station.

35. A bag stringing machine comprising guide means for a chain of bags, a bag supply station at one end of the guide and a bag stringing station at the other, bag supporting means at the bag stringing station, bag advancing means comprising a carriage reciprocable between the bag supply and bag stringing stations, said bag advancing means including bag gripper means adapted to deliver successive bags to the bag supporting means, cutting means for severing the threads binding the foremost bag of the chain to the remainder of the chain prior to delivery to the bag supporting means, and means for reversing each foremost bag in part at least prior to its delivery to the bag supporting means at the stringing station, said bag supporting means having reversible corner grippers for completing the reversing operation at the stringing station.

36. A bag stringing machine comprising a bag supply station, a bag stringing station spaced below the bag supply station, bag supporting means at the stringing station, bag advancing means comprising a carriage movable upwardly and downwardly between said stations in a rectilinear path, means for stringing successive bags at said stringing station, and means for reversing each bag in part at least prior to delivery to the bag supporting means at the stringing station.

37. A bag stringing machine comprising a bag chain supply station, a bag stringing station spaced below the supply station, bag advancing means comprising a carriage movable upwardly and downwardly between said stations in a rectilinear path, cutting means mounted on the carriage for severing the threads binding the foremost bag of the chain to the remainder of the chain prior to delivery of the bag to the stringing station, means for stringing successive bags at said stringing station, and means for reversing each bag prior to the stringing operation.

38. In a bag stringing machine for bags having hems at their mouth ends, a pair of needles for threading two drawstrings in opposite directions through the hems, each needle having a front eye and a rear eye, means for successively threading the front and rear eyes of the needles from string supply sources and forming drawstrings therefrom, and means for actuating the needles to thread the drawstrings through the bag hems.

39. A bag stringing machine including a pair of drawstring threading needles, each having a front eye and a rear eye, needle threader means for successively threading the front and rear eyes of the needles from sources of drawstring supply, puller means coacting with said drawstring threading needles for pulling the drawstrings for length, and cutters for severing the drawstrings from the sources of drawstring supply.

40. In a stringing machine, a stringing needle having a transverse eye, means for feeding string transversely of the needle through said eye, means for reciprocating said needle, a fixed guide abutment at one side of said needle, said needle being provided with a longitudinal groove on the side adjacent said abutment so that the string carried by the needle may freely pass the abutment.

41. In a stringing machine, a pair of stringing needles having transverse eyes, means for feeding string transversely of the needle through said eyes, means for reciprocating said needles, fixed guide abutments adjacent said needles, each said needle being longitudinally grooved on the side adjacent said abutment so that the string carried by the needle may freely pass the abutments.

42. In a stringing machine, a reciprocable stringing needle having a needle eye, means for supplying the needle with stringing thread from a string supply, clamping means independent of the needle located on the opposite side of the needle from the string supply for gripping an end of said thread, means for pulling out the supply string to form a looped drawstring portion, a second clamping means independent of the needle for clamping another portion of the drawstring after the operation of said loop forming means, said second clamping means being located on the same side of the needle as the string supply and comprising a stationary abutment and a movable member coacting therewith, and means for severing the thread from the supply means.

43. In a stringing machine, a pair of parallel stringing needles having eyes at their forward ends, means for reciprocating said needles in a direction parallel to their axes, means for inserting a stringing thread through the eyes of the needles from a string supply, in a direction transverse to the direction of movement of the needles, means located on the far side of the needles from the thread supply for clamping an end of the thread independently of the needles, means for pulling out the supply string to form a looped drawstring portion, a second clamping means independent of the needles positioned between the far needle and the thread supply for clamping another portion of the drawstring after the operation of said loop forming means, and means for severing the drawstring portion from the supply string.

44. A bag stringing machine including means for supporting a bag in drawstring threading position, means including a threading needle for inserting a drawstring into said bag, means for reciprocating said needle, means for supplying a drawstring to said needle, fixed abutment means, and clamping means arranged on opposite sides of said needle for clamping the drawstring at spaced intervals against said fixed abutment means.

45. A bag stringing machine including means for supporting a bag in drawstring threading position, means including a threading needle for inserting a drawstring from a supply into said bag, means for reciprocating said needle, means for supplying a drawstring to said needle, fixed abutment means, clamping means arranged in opposite sides of said needle for clamping the drawstring at spaced intervals against said fixed abutment means, and means for severing the drawstring from the supply.

46. In a bag stringing machine, a bag stringing station, bag reversing means at the stringing station, and bag mouth opening means at said station comprising a spring pressed pin-carrying head mounted for rotation in an arcuate path and having a projecting pin for yieldingly engaging a central portion of the bag adjacent the mouth thereof to facilitate reversal.

47. A bag stringing machine comprising a bag supply station, bag supporting means at said supply station, a bag stringing station spaced from the supply station, other bag supporting means at said bag stringing station, means for transferring a succession of bags from the bag supporting means at the supply station to the bag supporting means at said stringing station and means for reversing each bag in part at least prior to its delivery to the supporting means at said stringing station.

48. A bag stringing machine, comprising a bag supply station, a bag stringing station spaced from said supply station, bag supporting means at said stringing station, carrier means including bag engaging means for transferring a succession of bags from the supply station to the bag supporting means at the stringing station, and means for reversing each foremost bag in part at least prior to its delivery to the supporting means at the stringing station.

BERTIE C. GOLDEN.

REFERENCES CITED

The following references are of record in the file of this patent:

UNITED STATES PATENTS

| Number | Name | Date |
|---|---|---|
| 29,648 | Drake | Aug. 14, 1860 |
| 1,489,663 | Dalton | Apr. 8, 1924 |
| 2,274,622 | West | Feb. 24, 1942 |
| 2,296,783 | Golden | Sept. 22, 1942 |
| 2,304,908 | Golden | Dec. 15, 1942 |
| 2,308,133 | West | Jan. 12, 1943 |
| 2,313,433 | Golden | Mar. 9, 1943 |
| 2,401,535 | West | June 4, 1946 |